(12) United States Patent
Chen et al.

(10) Patent No.: US 12,111,474 B2
(45) Date of Patent: Oct. 8, 2024

(54) GRATING STRUCTURE, DIFFRACTION OPTICAL WAVEGUIDE, AND DISPLAY DEVICE

(71) Applicant: JIAXING UPHOTON OPTOELECTRONICS TECHNOLOGY CO., LTD., Tongxiang (CN)

(72) Inventors: Peng Chen, Tongxiang (CN); Guofang Sun, Tongxiang (CN); Lei Sui, Tongxiang (CN); Kehan Tian, Tongxiang (CN)

(73) Assignee: JIAXING UPHOTON OPTOELECTRONICS TECHNOLOGY CO., LTD., Tongxiang (CN)

( * ) Notice: Subject to any disclaimer, the term of this patent is extended or adjusted under 35 U.S.C. 154(b) by 0 days.

(21) Appl. No.: 18/350,683

(22) Filed: Jul. 11, 2023

(65) Prior Publication Data
US 2024/0077728 A1    Mar. 7, 2024

(30) Foreign Application Priority Data
Sep. 7, 2022 (CN) ................. 202211088337.3

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0016* (2013.01); *G02B 6/124* (2013.01);
(Continued)

(58) Field of Classification Search
CPC ............... G02B 5/1842; G02B 6/0026; G02B 27/0172; G02B 6/0076; G02B 2027/0178;
(Continued)

(56) References Cited

U.S. PATENT DOCUMENTS 8,666,208 B1 * 3/2014 Amirparviz .............. G02B 6/10
385/47
11,846,785 B1 * 12/2023 Sun ..................... G02B 27/4227
(Continued)

FOREIGN PATENT DOCUMENTS

CN    109696717 A    4/2019
CN    114502991 A    5/2022
(Continued)

OTHER PUBLICATIONS

Extended European Search Report issued in corresponding European Application No. 23195944.6, dated Apr. 30, 2024, pp. 1-9.

*Primary Examiner* — Daniel Petkovsek
(74) *Attorney, Agent, or Firm* — HAUPTMAN HAM, LLP

(57) ABSTRACT

A grating structure, a diffraction optical waveguide, and a display device are disclosed. The grating line of the grating structure has a cross-sectional profile with a narrow top and a wide bottom, wherein the cross-sectional profile comprises six feature points, and the six feature points respectively have coordinates (0, 0), (L2, H2), (L3, H3), (L4, H4), (L5, H5) and (L6, 0) in a cross section, and satisfy following relationships: $H_{drop}=\min(H4,H5)-\max(H3,H2)>50$ nm; $0.1<(L5-L4)/(L3-L2)$; $L3>0.34T$; and $0.05T<L5-L4<0.32T$. By controlling the parameters of these feature points, the cross-sectional profile can be adjusted, and thus significantly improving the optical effect (comprising diffraction efficiency and uniformity) that the grating structure (Continued)

can achieve, and at the same time increasing degrees of freedom in grating design and optical effect regulation.

20 Claims, 16 Drawing Sheets

(51) Int. Cl.
*G02B 6/124* (2006.01)
*G02B 6/34* (2006.01)
(52) U.S. Cl.
CPC ........ *G02B 27/0101* (2013.01); *G02B 6/0026* (2013.01); *G02B 6/34* (2013.01)
(58) Field of Classification Search
CPC .......... G02B 6/0011; G02B 2027/0127; G02B 27/4272; G02B 2027/0185; G02B 27/0081; G02B 27/4205; G02B 6/0016; G02B 6/124; G02B 6/34; G02B 27/0101; H04N 13/344
USPC ................... 359/571; 385/25, 34–37, 49–50, 385/129–132
See application file for complete search history.

(56) References Cited

U.S. PATENT DOCUMENTS

| | | | |
|---|---|---|---|
| 2017/0256330 A1* | 9/2017 | Moldovan | C23C 14/042 |
| 2018/0081265 A1* | 3/2018 | Singh | G02B 5/1857 |
| 2021/0072437 A1* | 3/2021 | Singh | G02B 27/0172 |
| 2021/0116645 A1* | 4/2021 | Kojima | G02B 6/124 |
| 2022/0229304 A1 | 7/2022 | Luo et al. | |

FOREIGN PATENT DOCUMENTS

| | | |
|---|---|---|
| CN | 114637116 A | 6/2022 |
| CN | 114859555 A | 8/2022 |
| CN | 115016057 A | 9/2022 |

* cited by examiner

GRATING STRUCTURE, DIFFRACTION OPTICAL WAVEGUIDE, AND DISPLAY DEVICE

FIELD OF THE INVENTION

The present disclosure refers to diffraction-based display technology, in particular to a diffraction optical waveguide for display, a grating structure that can be used for the diffraction optical waveguide, and a display device having the diffraction optical waveguide.

BACKGROUND

With development of science and technology, AR (Augmented Reality) technology, as a very intelligent and portable display technology, gradually becomes more and more popular. Its main feature is to superimpose a virtual picture on a real scene so that people can watch the real scene while watching the virtual picture. It is precisely because of the above feature of AR display that the technology is currently being more and more widely used in security, education, medical, military, industrial, entertainment, and other industries.

A diffraction optical waveguide is currently a mainstream solution for realizing the AR display, in which a waveguide grating is arranged on a waveguide substrate, the waveguide grating including a coupling-in grating and a coupling-out grating. The coupling-in grating couples incident light carrying image information into the waveguide substrate. The coupling-out grating propagates and expands the light carrying image information, and at the same time couples the light out of the waveguide substrate to form a coupled-out light field. The eye receives the light of the coupled-out light field, and thus, for example, an image carried by the incident light can be observed.

However, an existing design scheme of a waveguide grating, especially a coupling-in grating, has many disadvantages, such as a low degree of freedom, a low diffraction efficiency, a difficulty in controlling diffraction uniformity, and a difficulty in designing and processing a product.

SUMMARY

The object of the present disclosure is to provide a diffraction optical waveguide and a design method and a formation method thereof, and a display device including the diffraction optical waveguide, so as to at least partly overcome the deficiencies in the prior art.

According to one aspect of the present disclosure, a diffraction optical waveguide is provided, which includes a plurality of grating lines arranged in a plane, the plurality of grating lines being arranged with a period of T along a first direction in the plane and extending along a second direction perpendicular to the first direction, wherein, each of at least part of the plurality of grating lines has a cross-sectional profile with a narrow top and a wide bottom in a cross-section perpendicular to the second direction, and the cross-sectional profile comprises six feature points being in sequence along the first direction, which are a first feature point, a second feature point, a third feature point, a fourth feature point, a fifth feature point, and a sixth feature point, and the feature points are the points where maximum curvatures of the cross-sectional profile are located, and in a coordinate system with the first feature point as an origin, the first direction as a first coordinate axis L, and a direction perpendicular to the plane as a second coordinate axis H, the first feature point, the second feature point, the third feature point, the fourth feature point, the fifth feature point, and the sixth feature point respectively have coordinates (0, 0), (L2, H2), (L3, H3), (L4, H4), (L5, H5) and (L6, 0), and satisfy following relationship:

$H_{drop}=\min(H4,H5)-\max(H3,H2)>50$ nm;

$0.1<(L5-L4)/(L3-L2)$;

$L3>0.34T$; and $0.05T<L5-L4<0.32T$.

Advantageously, $0.025T<L3-L2<0.65T$.

Advantageously, the six feature points also satisfy at least one of following relationships:

140 nm $<H_{drop}<200$ nm $0.13T<L5-L4<0.25T$;

$L3>0.59T$; and $0.05T<L3-L2<0.3T$.

Advantageously, $\min(H4, H5)>200$ nm; $\min(H2, H3)>50$ nm.

Advantageously, $\min(H4, H5)>400$ nm, and/or $\min(H2, H3)>150$ nm.

In some embodiments, the cross-sectional profile comprises at least a curve which is formed between two adjacent feature points among the first feature point, the second feature point, the third feature point, the fourth feature point, the fifth feature point, and the sixth feature point.

In some embodiments, the cross-sectional profile comprises at least a straight line which is formed between two adjacent feature points among the first feature point, the second feature point, the third feature point, the fourth feature point, the fifth feature point, and the sixth feature point.

In some embodiments, the cross-sectional profile comprises five straight lines each of which is formed between two adjacent feature points among the first feature point, the second feature point, the third feature point, the fourth feature point, the fifth feature point, and the sixth feature point.

In some embodiments, the cross-sectional profile is a stepped profile, wherein L2=0, H2=H3, L3=L4, H4=H5 and L5=L6; and following relationship are satisfied:

$0.3T<L3-L2<0.7T$;

$0.1T<L5-L4<0.4T$;

$0.15<(L5-L4)/(L3-L2)<0.8$; and $0.65T<L3-L2+L5-L4<0.9T$.

Advantageously, 160 nm $<H3<420$ nm, 320 nm $<H5<600$ nm.

Advantageously, the six feature points also satisfy at least one of following relationships:

$0.4T<L3-L2<0.66T$;

$0.2<(L5-L4)/(L3-L2)<0.78$;

$0.71T<L3-L2+L5-L4<0.85T$;

185 nm $<H3<340$ nm; and 350 nm $<H5<590$ nm.

In some embodiments, H2≠H3, and/or H4≠H5.

In some embodiments, H2>H3, and/or H4>H5.

Advantageously, |H4−H5|<100 nm, and/or |H2−H3|<100 nm.

According to another aspect of the present disclosure, a diffraction optical waveguide for display is provided, which includes a waveguide substrate and a coupling-in grating arranged on the waveguide substrate, the coupling-in grating including the above-mentioned grating structure configured to couple a light beam into the waveguide substrate, enabling the light beam to propagate within the waveguide substrate through total internal reflection.

In some embodiments, the diffraction optical waveguide further includes a coupling-out grating arranged on the waveguide substrate, wherein the coupling-out grating is configured to couple at least a portion of the light beam within the waveguide substrate propagating thereinto the waveguide substrate through total internal reflection substantially along the coupling-in direction out of the waveguide substrate by diffraction, the first direction being substantially consistent with the coupling-in direction.

According to yet another aspect of the present disclosure, a display device is provided, including the above-mentioned diffraction optical waveguide Advantageously, the display device is a near-eye display device and includes a lens and a frame for holding the lens close to the eye, the lens including the diffraction optical waveguide.

Advantageously, the display device is an augmented reality display device or a virtual reality display device.

According to the embodiment of the present disclosure, the cross-sectional profile of the grating line of the grating structure includes six feature points. By controlling parameters of these feature points, the cross-sectional profile can be adjusted, thereby significantly improving an optical effect (including diffraction efficiency and uniformity) that the grating structure can achieve, and at the same time increasing degrees of freedom of the grating design and optical effect regulation. In addition, a stepped grating structure according to an embodiment of the present disclosure is not only beneficial to achieve the above technical effect, but also helpful to reduce the difficulty in designing and processing as well as improve the conformity of a processed structure with respect to a designed structure. Correspondingly, the diffraction optical waveguide and the display device according to the embodiments of the present disclosure also have the above-mentioned technical advantages.

BRIEF DESCRIPTION OF THE DRAWINGS

Other features, objects, and advantages of the present disclosure will become more apparent by reading the following detailed description of non-limitative embodiments with reference to the following drawings.

DETAILED DESCRIPTION

Figure 1:
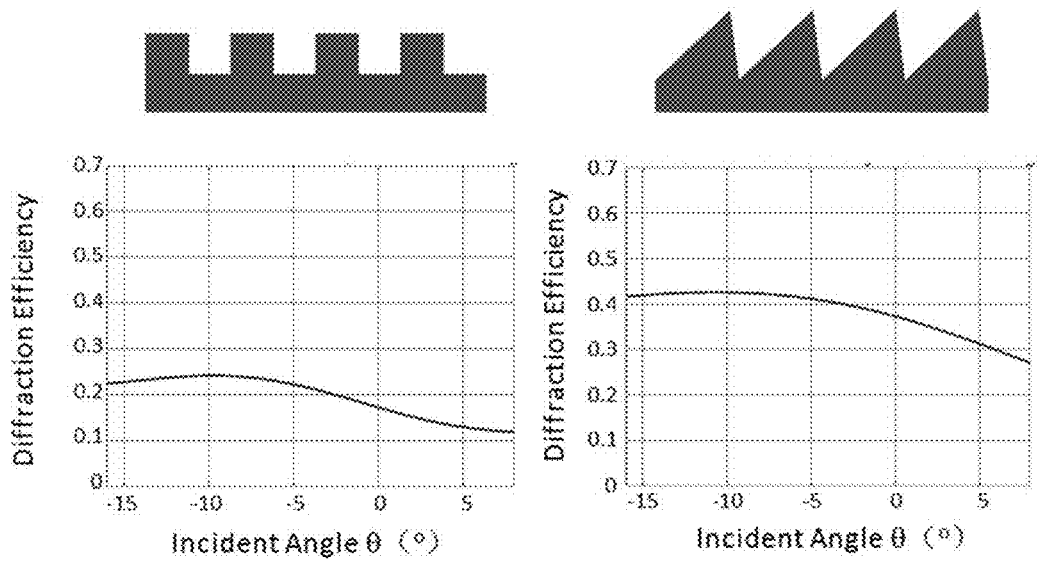
FIG. 1 shows curves of diffraction efficiencies changing with incident angles when a rectangular grating and a blazed grating are respectively used as coupling-in gratings in diffraction optical waveguides.

The present disclosure will be further described in detail in conjunction with drawings and embodiments. It should be understood that the specific embodiments described herein are only used to explain the related disclosure, but not to limit the disclosure. For the convenience of description, only the parts related to the disclosure are shown in the drawings. It should be noted that the embodiments in the present application and the features of the embodiments may be combined with each other without conflict.

Before introducing embodiments of the present disclosure, firstly refer to FIG. 1 to understand a structure of a coupling-in grating in a diffraction optical waveguide in a prior art. FIG. 1 schematically shows two grating structures commonly used in coupling-in gratings in existing diffraction optical waveguides, namely a rectangular grating (see a left graph in FIG. 1) and a blazed grating (see a right graph in FIG. 1). Curves of diffraction efficiencies changing with incident angles after the grating structures are optimized when being respectively used as coupling-in gratings in diffraction optical waveguides are correspondingly shown below the rectangular grating and the blazed grating in FIG. 1. As shown in these curves, the diffraction efficiency of the rectangular gratings is generally below 0.25; and the diffraction efficiency of the blazed grating is generally below 0.42. In this application, the "diffraction efficiency" of the coupling-in grating refers to a ratio $\Phi_{coupling-in}/\Phi_{incident}$ of light energy $\Phi_{coupling-in}$ coupled into the waveguide through the diffraction effect of the coupling-in grating to light energy $\Phi_{incident}$ incident on the coupling-in grating. It can be seen that the diffraction efficiencies of the rectangular grating and the blazed grating greatly limit improvement in image display brightness of the diffraction waveguide. This application is based on the discovery of this problem.

The problem of low light utilization efficiency and insufficient brightness of diffraction optical waveguide used for image display has been concerned. However, in an exploration process, people pay more attention to how to improve a utilization efficiency of the light energy that has been coupled into the waveguide through the diffraction effect of the coupling-in grating, while the exploration and research on a novel structure of the coupling-in grating itself are still insufficient.

Next, a diffraction optical waveguide and a novel grating structure according to an embodiment of the present disclosure will be described with reference to the drawings.

Figure 2:
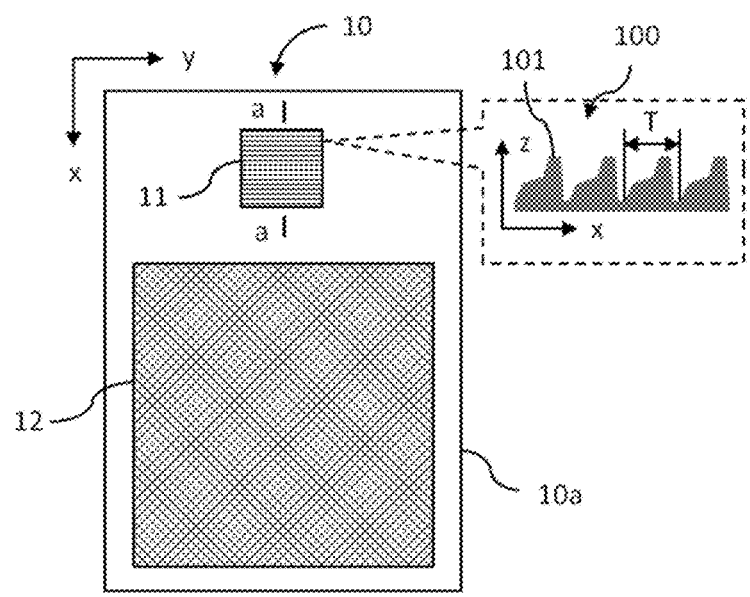
FIG. 2 is a schematic diagram of a diffraction optical waveguide according to an embodiment of the present disclosure.

FIG. 2 is a schematic diagram of a diffraction optical waveguide according to an embodiment of the present disclosure. As shown in FIG. 2, a diffraction optical waveguide 10 includes a waveguide substrate 10a and a coupling-in grating 11 arranged on the waveguide substrate 10a, wherein the coupling-in grating 11 includes a novel grating structure 100 according to an embodiment of the present disclosure, configured to couple a light beam into the waveguide substrate 10a to propagate therewithin through total internal reflection.

A cross-sectional view of the coupling-in grating 11 taken along section line a-a is shown in a dotted box of FIG. 2. As shown in the cross-sectional view, the grating structure 100 used in the coupling-in grating 11 includes a plurality of grating lines 101 arranged in an x-y plane, the plurality of grating lines 101 being arranged with a period of T along an x direction in the x-y plane and extending along a y direction perpendicular to the x direction. The plurality of grating lines each have cross-sectional profiles with narrow tops and wide bottoms in a cross section perpendicular to the y direction.

The diffraction optical waveguide 10 further includes a coupling-out grating 12 arranged on the waveguide substrate 10a, configured to couple at least a portion of the light within the waveguide substrate 10a propagating thereinto the waveguide substrate through total internal reflection substantially along a coupling-in direction out of the waveguide substrate 10a by diffraction, wherein the first direction is substantially consistent with the coupling-in direction.

Figure 3:
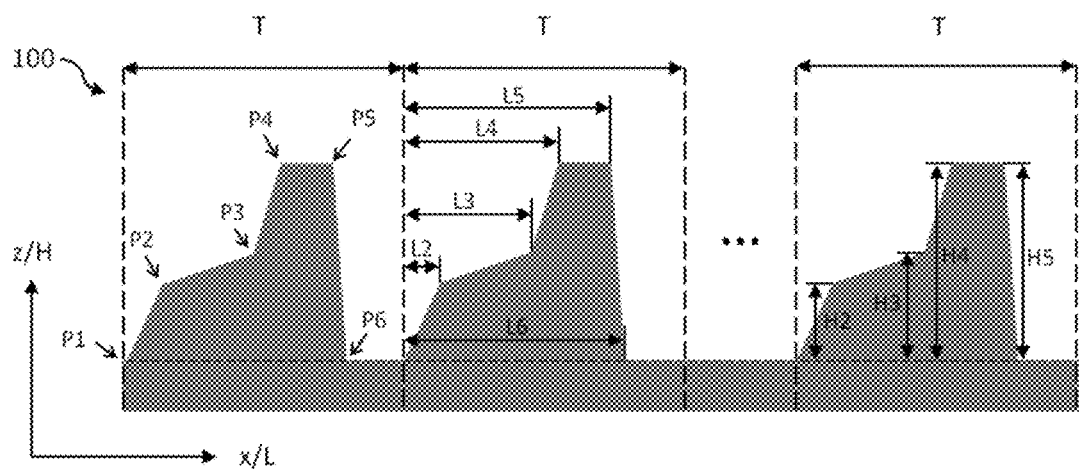
FIG. 3 is a cross-sectional schematic diagram of a grating structure according to an embodiment of the present disclosure.

FIG. 3 shows a cross-section of the grating structure 100 according to an embodiment of the present disclosure in an enlarged schematic view. As shown more clearly in FIG. 3, the cross-sectional profile of the grating line 101 includes six feature points being in sequence along the x direction, that is, a first feature point P1, a second feature point P2, a third feature point P3, a fourth feature point P4, a fifth feature point P5, and a sixth feature point P6.

In this disclosure, "feature point" refers to a maximum curvature point of the cross-sectional profile, which includes an intersection point between a straight line and a straight line or between a straight line and a curve that are not tangent to each other. In the disclosure, such an intersection point is considered as a maximum point of infinite curvature.

In addition, the above-mentioned first feature point P1 and the sixth feature point P6 are the points where the grating line 101 intersects with a reference plane B of the grating structure 100. Generally, the reference plane B can be, for example, a surface of the waveguide substrate 10a; and in other cases, the reference plane B can also be another plane constructed or processed on the surface of the waveguide substrate 10a, which can protrude above the surface of the waveguide substrate 10a or sunk thereinto.

As shown in FIG. 3, in a coordinate system with the first feature point P1 as an origin, the x direction as a horizontal coordinate axis L, and a z direction perpendicular to the x-y plane as a height coordinate axis H, and the first feature point P1, the second feature point P2, the third feature point P3, the fourth feature point P4, the fifth feature point P5 and the sixth feature point P6 respectively have coordinates (L1, H1), (L2, H2), (L3, H3), (L4, H4), (L5, H5), and (L6, H6), L1=0, H1=0, and H6=0. It should be understood that, due to existence of processing errors, the height H1 of the first feature point P1 and the height H6 of the sixth feature point P6 may have very small values, such as ranging from a few nanometers to about twenty nanometers, which has little effect on an overall cross-sectional profile of the grating line.

According to the embodiment of the present invention, in order to obtain a better optical effect, the cross-sectional profile of the grating structure 100 also satisfies the following parameter conditions.

$$H_{drop}=\min(H4,H5)-\max(H3,H2)>50 \text{ nm};$$

$$0.1<(L5-L4)/(L3-L2);$$

$$L3>0.34T; \text{ and}$$

$$0.05T<L5-L4<0.32T$$

The optical effect of the grating structure 100 concerned in this disclosure includes a diffraction efficiency when the grating structure 100 is used as a coupling-in grating for coupling light into the waveguide substrate 10a and a distribution uniformity of diffraction efficiencies between different field of view angles within the range of the field of view angle FOVY. The field of view angle FOVY refers to an angle formed by a ray incident on the coupling-in grating 11 relative to a normal line of the x-y plane in a direction around the y-axis. In order to understand and evaluate the optical effect of the grating structure 100 more intuitively, an optical effect index merit=eff−0.35×uni is constructed here, where eff is an average diffraction efficiency index, that is, an average value of diffraction efficiencies within the range of the field of view angle FOVY of the coupling-in grating, and an ideal maximum value thereof is 1, the larger the value, the higher the diffraction efficiency; and uni is a non-uniformity index, wherein uni=(max−min)/(max+min), max is a maximum diffraction efficiency within the range of field of view angle FOVY, min is a minimum diffraction efficiency within the range of field of view angle FOVY, and an ideal optimal value of uni is 0, and the smaller the value, the better the uniformity.

In order to illustrate the technical effect of the grating structure 100 according to the embodiment of the present invention in terms of diffraction efficiency and uniformity, a simulation calculation (Simulation 1) and its results based on the grating structure 100 shown in FIG. 3 will be introduced below.

In various simulation calculations and examples given below, a wavelength of light is 532 nm; and refractive indices of the waveguide substrate and a material of the grating structure are both 1.9.

Simulation 1

In Simulation 1, it is assumed that, the first to sixth feature points in the cross-sectional profile of the grating line of the grating structure 100 are sequentially connected by straight lines, and preset parameters are as below: L2=0.1T; L4−L3=0.1T; H4=H5; H2=H3; (H3+H4)/2=390 nm; and L5=L6.

On the basis of the above-preset parameters, through scanning the parameter $H_{drop}$=H4−H3 with a step size of 10 nm within a range from 30 nm to 200 nm, scanning the parameter L3 with a step size of 0.025T within a range from 0.24T to 0.64T, scanning the parameter L3−L2 with a step size of 0.025T within a range from 0 to 0.8T, and scanning parameters L5−L4 with a step size of 0.05T within a range from 0 to 0.55T, various grating structures with different cross-sectional profiles are obtained; and the average diffraction efficiency index eff and the non-uniformity index uni are obtained through the simulation calculation based on a vector theory or a scalar theory of light propagation, so as to calculate the value of the optical effect index merit.

In order to investigate an influence of different parameters on the optical effect, various results calculated in Simulation 1 are counted and drawn as different charts, which are shown in FIG. 4 to FIG. 8 respectively.

In these charts, each black dot represents a cross-sectional profile/grating structure with abscissa and ordinate values corresponding to the points in the chart, and with a combination of parameters scanned in Simulation 1 and different from other black dots. In these charts, a maximum merit value of the ordinate reached by the black dot corresponding to a certain abscissa value represents an optimal optical effect that may be achieved through optimization under a condition of a parameter value of the abscissa. At the same time, a density of a dot group corresponding to a certain abscissa value as well as ordinate value represents a number of parameter combinations (scanned in Simulation 1) that can achieve a merit value of the ordinate under the condition of the parameter value of the abscissa. The greater the density, the greater the number of parameter combinations, which usually means that the grating structure that satisfies the parameter conditions on the abscissa and the merit value on the ordinate is easy to obtain and realize. On the contrary, the smaller the density, the fewer the number of parameter combinations, and the smaller the density usually means that the grating structure that satisfies the parameter conditions on the abscissa and the merit value on the ordinate is more difficult to obtain and realize.

FIG. 4, FIG. 5, FIG. 6, FIG. 7, and FIG. 8 are charts of the optical effect indices merit(s) based on the grating structure shown in FIG. 3 respectively changing with the parameters $H_{drop}$ (s) (corresponding to the abscissas "delta_h"), L3, L3−L2, L5−L4, and (L5−L4)/(L3−L2). The lower charts in FIG. 4, FIG. 5, FIG. 6 and FIG. 7 are all enlarged illustrations of the parts of dashed boxes in the upper charts.

Based on results shown in FIGS. 4 to 8, the optical effect index merit=0.43 is selected as a first primary optimization objective, and merit=0.47 is selected as a first advanced optimization objective. Although the above-mentioned first primary optimization objective and first advanced optimization objective in this disclosure are standards that can be flexibly selected, compared with the optical effect (the merit values of the optical effect indices are 0.15 and 0.30, respectively) that can be achieved after optimization of the rectangular grating and the blazed grating commonly used in the coupling grating of the diffraction optical waveguide as shown in FIG. 1, the first primary optimization objective has represented a great improvement in the optical effect, while the first advanced optimization objective represents a further improvement in the optical effect compared with the first primary optimization objective.

Figure 4:
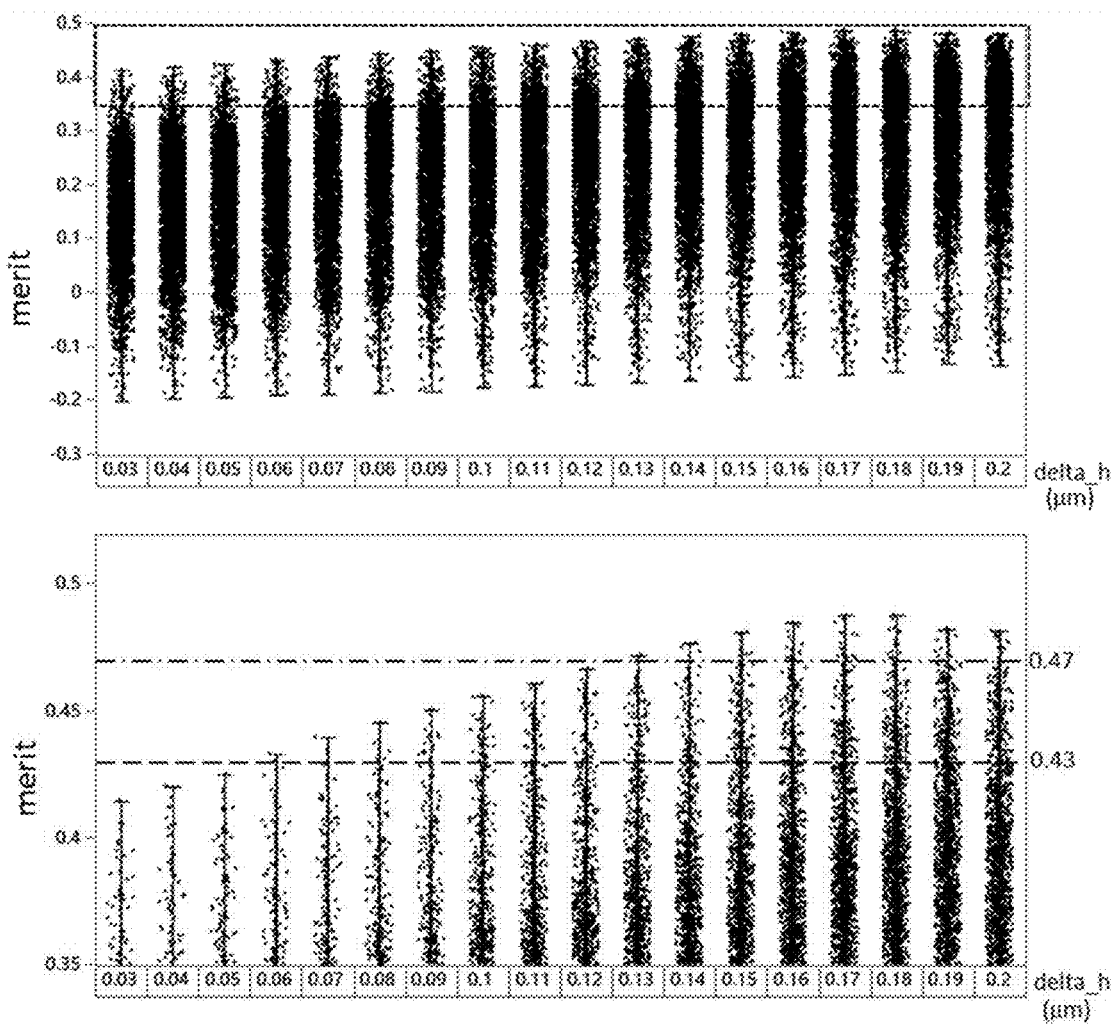
FIG. 4 are charts of optical effect indices changing with parameters $H_{drop}$ based on simulation of the grating structure shown in FIG. 3.

Referring to FIG. 4, it can be seen that in the grating structure 100 according to the embodiment of the disclosure, in order to achieve the first primary optimization objective merit=0.43, advantageously $H_{drop}$>50 nm; and in order to achieve the first advanced optimization objective merit=0.47, advantageously 140 nm<$H_{drop}$<200 nm.

Figure 5:
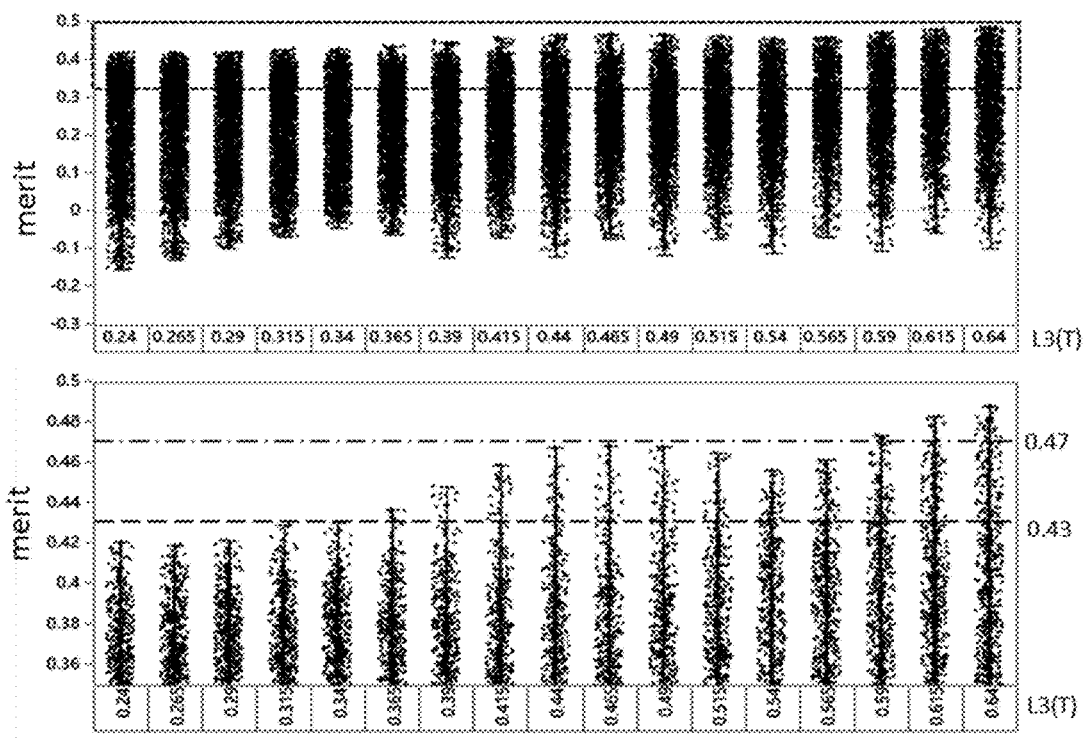
FIG. 5 are charts of optical effect indices changing with parameters L3 based on simulation of the grating structure shown in FIG. 3.

Referring to FIG. 5, it can be seen that in the grating structure 100 according to an embodiment of the disclosure, in order to achieve the first primary optimization objective, advantageously L3>0.34T; in order to achieve the first advanced optimization objective, advantageously L3>0.59T.

Figure 6:
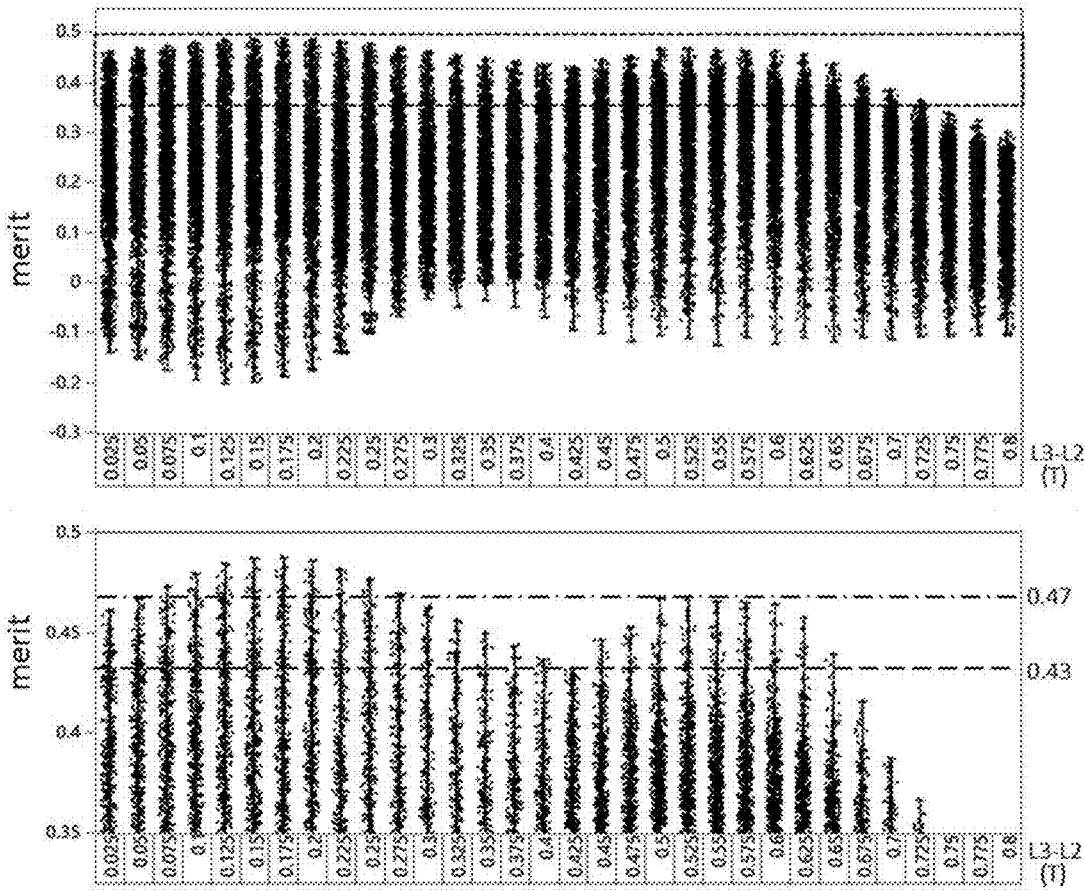
FIG. 6 are charts of optical effect indices changing with parameters L3−L2 based on simulation of the grating structure shown in FIG. 3.

Referring to FIG. 6, it can be seen that in the grating structure 100 according to the embodiment of the disclosure, in order to achieve the first primary optimization objective, advantageously 0.025T<L3−L2<0.65T; in order to achieve the first advanced optimization objective, advantageously 0.05T<L3−L2<0.3T.

Figure 7:
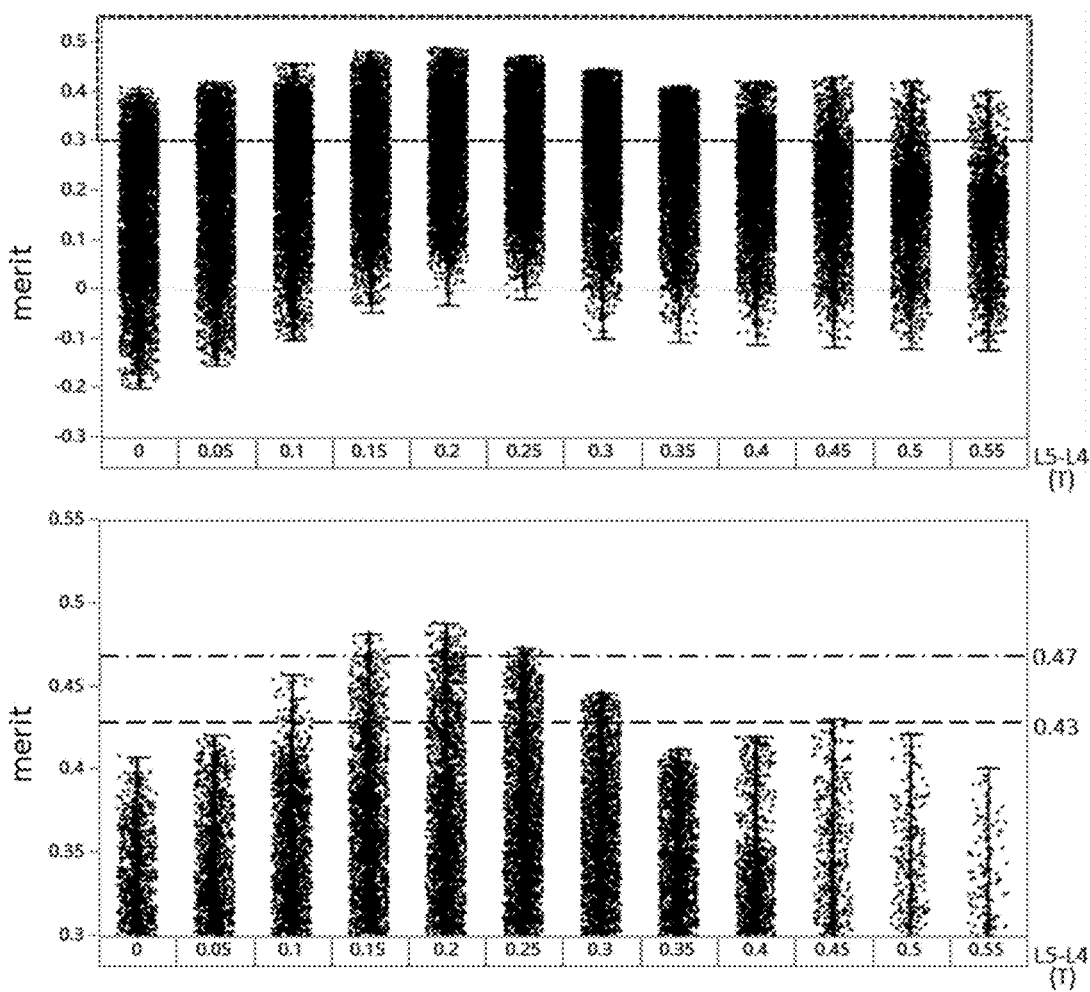
FIG. 7 are charts of optical effect indices changing with parameters L5−L4 based on simulation of the grating structure shown in FIG. 3.

Referring to FIG. 7, it can be seen that in the grating structure 100 according to the embodiment of the disclosure, in order to achieve the first primary optimization objective, advantageously 0.05T<L5−L4<0.32T; in order to achieve the first advanced optimization objective, advantageously 0.13T<L5−L4<0.25T.

Figure 8:
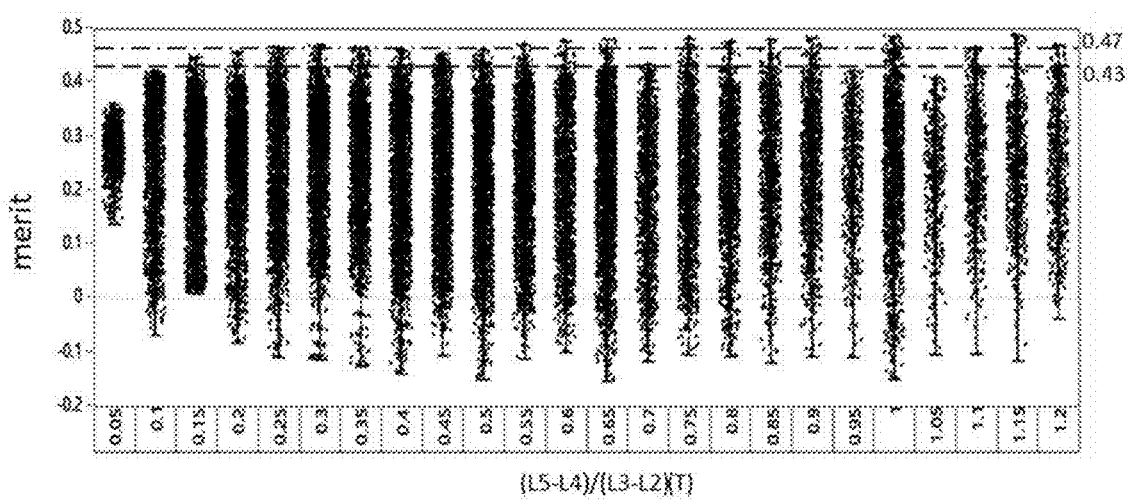
FIG. 8 is a chart of an optical effect index changing with a parameter (L5−L4)/(L3−L2) based on simulation of the grating structure shown in FIG. 3.

Referring to FIG. 8, it can be seen that in the grating structure 100 according to an embodiment of the invention, in order to achieve the first primary optimization objective, advantageously 0.1<(L5−L4)/(L3−L2). At the same time, it can be seen that in multiple scattered value ranges of the parameter (L5−L4)/(L3−L2), the parameter combination/grating structure being capable of achieving the first advanced optimization objective can be obtained/realized.

In addition to the above Simulation 1, other simulation calculations that scan the feature point parameters of the grating line profile of the grating structure 100 may also be constructed, so as to obtain other parameter conditions that help to realize the above-mentioned first primary optimization objective or first advanced optimization objective. For example, through other simulation calculations, it is found that, min(H4, H5)>200 nm as well as min(H2, H3)>50 nm helps to realize the first primary optimization objective; and min(H4, H5)>400 nm as well as min(H2, H3)>150 nm helps to realize the first advanced optimization objective.

In Simulation 1, H4=H5 and H2=H3 are preset. However, the grating structure 100 according to the embodiment of the disclosure is not limited to this. In some cases, the grating structure 100 may be constructed such that H2/H3 and/or H4/H5. For example, the grating structure 100 may be constructed such that H2>H3, and/or H4>H5.

For ease of understanding, Example 1 of the grating structure according to an embodiment of the present disclosure and variants thereof are described below with reference to FIGS. 9 and 10.

Figure 9:
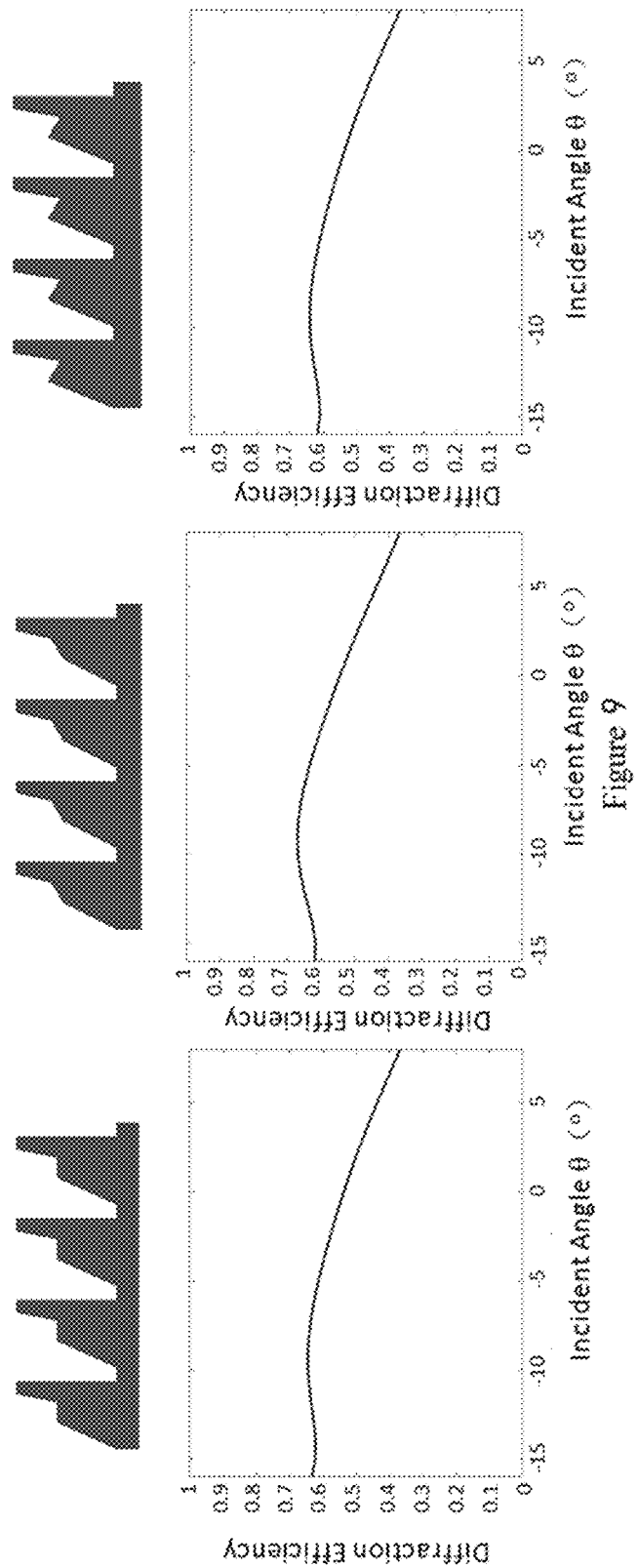
FIG. 9 shows Example 1 of a grating structure and Variant 1 and Variant 2 thereof according to an embodiment of the present invention, as well as curves of diffraction efficiencies changing with incident angles when they are respectively used as coupling-in gratings in diffraction optical waveguides.

An upper part of FIG. 9 shows Example 1 of the grating structure and its Variant 1 and Variant 2 from left to right, and curves of diffraction efficiencies changing with incident angles FOVY(s) when they are used as coupling-in gratings in respective diffraction optical waveguides are respectively shown below these grating structures. An upper part of FIG. 10 shows Variant 3, Variant 4, and Variant 5 of Example 1 of the grating structure shown in FIG. 9 respectively from left to right, and curves of diffraction efficiencies changing with incident angles FOVY(s) when they are respectively used as coupling-in gratings in the diffraction optical waveguides are correspondingly shown below these grating structures.

Figure 10:
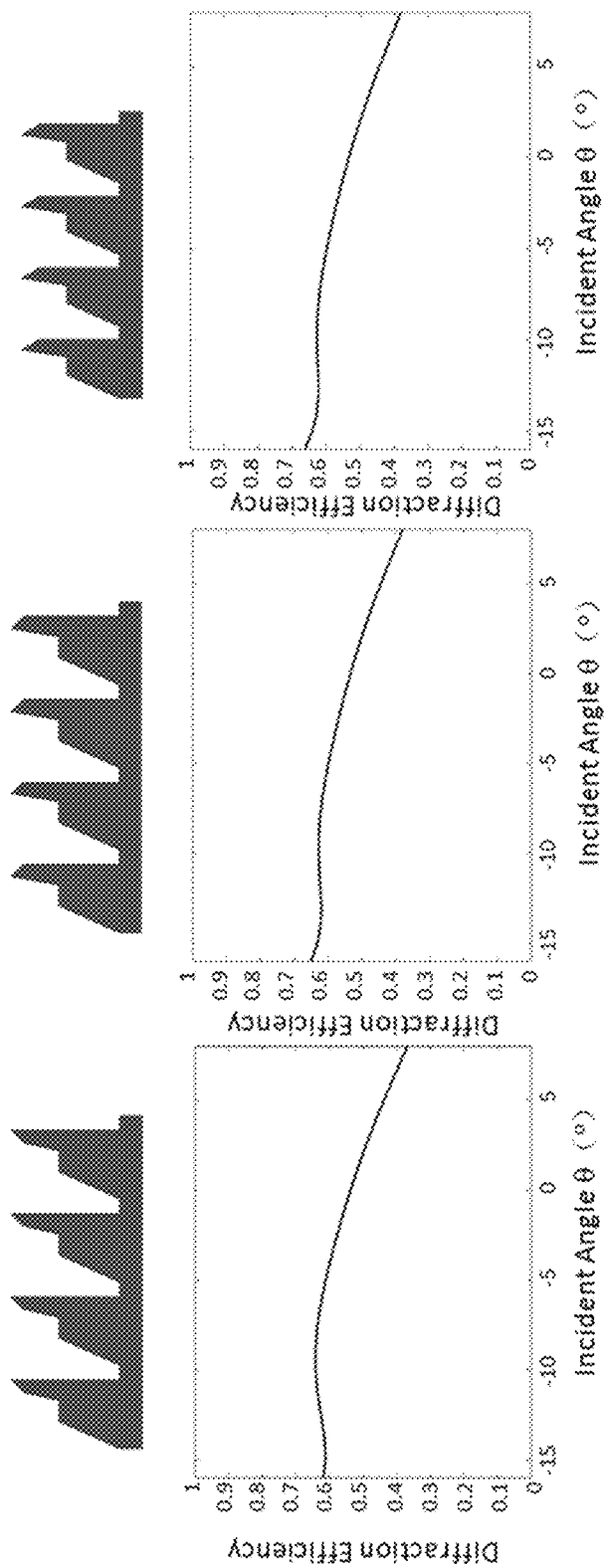
FIG. 10 shows Variant 3, Variant 4, and Variant 5 of Example 1 of the grating structure shown in FIG. 9 and curves of diffraction efficiencies changing with the incident angle when they are respectively used as coupling-in gratings in diffraction optical waveguides.

Table 1 shows some parameters of the cross-sectional profiles of the grating lines of Example 1 and its Variants 1 to 5 of the grating structures shown in FIG. 9 and FIG. 10, as well as values of the indices merit, eff, and unit obtained by simulation. The unit of the parameter L in Table 1 is the grating line period "T", and the unit of the parameter H is "nm".

there is little effect on them, which shows that good performances of both the diffraction efficiency and the uniformity can be maintained.

Although not shown herein, other more simulation calculations show that, satisfying |H4−H5|<100 nm and |H2−H3|<100 nm is beneficial to obtain a grating structure that meets the first primary optimization objective and the first advanced optimization objective.

In Simulation 1, it is assumed that the first to sixth feature points in the cross-sectional profile of the grating line of the grating structure 100 are sequentially connected by straight profile lines, that is, the cross-sectional profile includes five straight lines each of which is formed between two adjacent feature points among the first feature point P1, the second feature point P2, the third feature point P3, the fourth feature point P4, the fifth feature point P5, and the sixth feature point P6. However, the grating structure 100 according to the embodiment of the present disclosure is not limited to a case where the cross-sectional profile only includes straight lines. For example, the cross-sectional profile of the grating line may include at least a curve which is formed between two adjacent feature points among the first feature point P1, the second feature point P2, the third feature point P3, the fourth feature point P4, the fifth feature point P5, and the sixth feature point P6. In some examples, five profile lines can all be curves.

In order to facilitate the understanding of the above situations with different profile lines and their influence on the optical effect of the grating structure 100, Example 2 of the grating structure 100 according to the embodiment of the

TABLE 1

| Serial number | Coordinate | P1 | P2 | P3 | P4 | P5 | P6 | delta_h | merit | eff | uni |
|---|---|---|---|---|---|---|---|---|---|---|---|
| Example 1 | L | 0 | 0.33 | 0.58 | 0.68 | 0.83 | 0.83 | | | | |
| | H | 0 | 290 | 290 | 490 | 490 | 0 | 200 | 0.4654 | 0.5609 | 0.2729 |
| Variant 1 | L | 0 | 0.33 | 0.58 | 0.68 | 0.83 | 0.83 | | | | |
| | H | 0 | 260 | 320 | 490 | 490 | 0 | 170 | 0.4661 | 0.5692 | 0.2946 |
| Variant 2 | L | 0 | 0.33 | 0.58 | 0.68 | 0.83 | 0.83 | | | | |
| | H | 0 | 320 | 260 | 490 | 490 | 0 | 170 | 0.4300 | 0.5304 | 0.2867 |
| Variant 3 | L | 0 | 0.33 | 0.58 | 0.68 | 0.83 | 0.83 | | | | |
| | H | 0 | 290 | 290 | 460 | 520 | 0 | 170 | 0.4627 | 0.5575 | 0.2706 |
| Variant 4 | L | 0 | 0.33 | 0.58 | 0.68 | 0.83 | 0.83 | | | | |
| | H | 0 | 290 | 290 | 520 | 460 | 0 | 170 | 0.4639 | 0.5559 | 0.2628 |
| Variant 5 | L | 0 | 0.33 | 0.58 | 0.68 | 0.83 | 0.83 | | | | |
| | H | 0 | 290 | 290 | 540 | 440 | 0 | 150 | 0.4623 | 0.5572 | 0.2709 |

As shown in Table 1, in Example 1 of the grating structure 100 and its variants 1-5, the abscissas L(s) of the six feature points are all the same; correspondingly, they have same parameters shown in Table 2:

TABLE 2

| (L5 − L4)/(L3 − L2) | L3 | L5 − L4 | L3 − L2 | (L5 − L4) + (L3 − L2) |
|---|---|---|---|---|
| 0.29 | 0.50 | 0.10 | 0.33 | 0.43 |

Referring to FIG. 9, FIG. 10, and Table 1, by comparing Example 1 of the grating structure 100 and each variant, it can be found that, under the condition that, other parameters are approximately the same and the height of the feature points are adjusted so that H2≠H3 and/or H4≠H5 have little effect on the obtained optical effect index merit, and the above-mentioned primary optimization objective or the first advanced optimization objective can still be achieved. In addition, by observing the average diffraction efficiency eff and the non-uniformity uni respectively, it can be found that, present disclosure and its variant are introduced below with reference to FIG. 11. An upper part of FIG. 11 shows Example 2 of the grating structure 100 and its Variant 1 and Variant 2 respectively from left to right, and curves of the diffraction efficiency changing with incident angles when they are respectively used as coupling-in gratings in diffraction optical waveguides are correspondingly shown below these grating structures.

Figure 11:
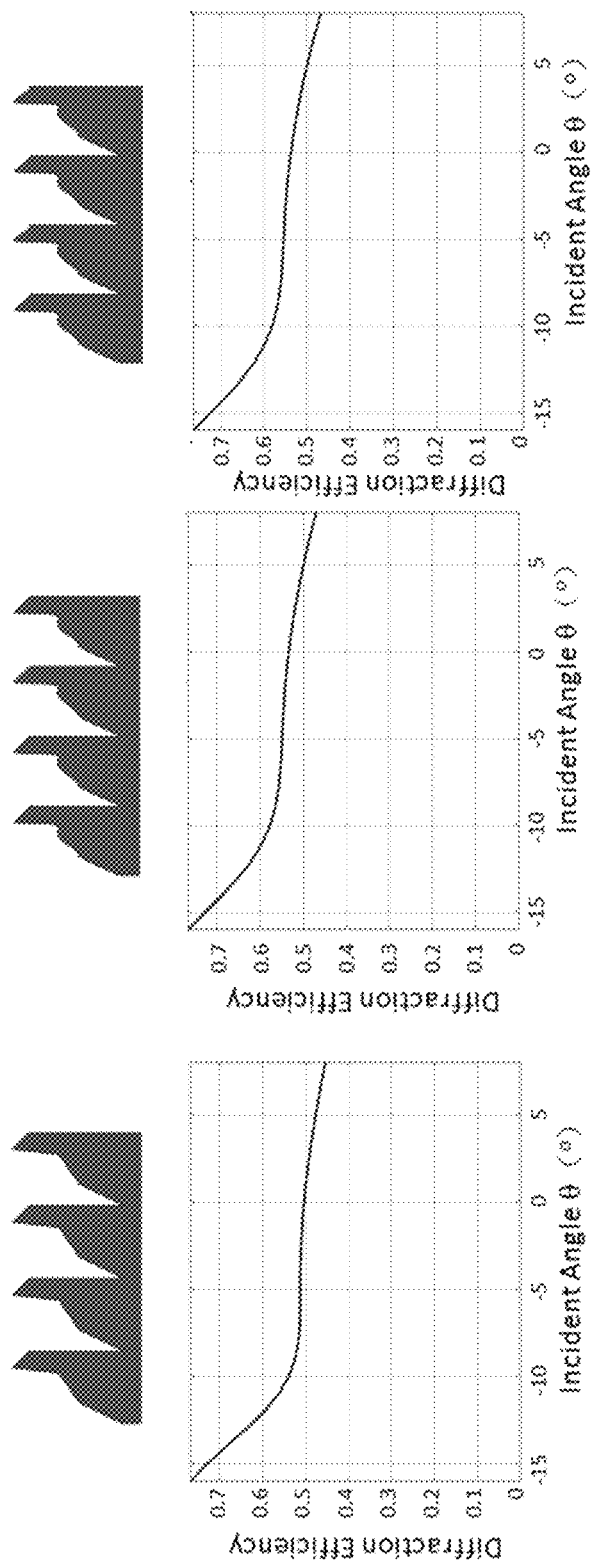
FIG. 11 shows Example 2 of a grating structure and Variant 1 and Variant 2 thereof according to an embodiment of the present disclosure, as well as curves of diffraction efficiencies changing with incident angles when they are respectively used as coupling-in gratings in diffraction optical waveguides.

A difference between the grating structures in the example shown in FIG. 11 and its variant lies in that, the profile lines formed among the feature points in Example 2 are all straight lines. In Variant 1, the profile lines formed among the first feature point P1, the second feature point P2, the third feature point P3, and the fourth feature point P4 are curves, while the profile lines formed among the fourth feature point P4, the fifth feature point P5, and the sixth feature point P6 are straight lines; and the profile lines formed among feature points in Variant 2 are all curve.

Table 3 shows some parameters of the cross-sectional profiles of the grating lines of Example 2 and its Variant 1 and Variant 2 of the grating structure shown in FIG. 11, as well as the values of the indices merit, eff, and unit obtained by simulation. The unit of the parameter L in Table 3 is grating line period "T", and the unit of parameter H is "nm".

TABLE 3

| Serial number | Coordinate | P1 | P2 | P3 | P4 | P5 | P6 | delta_h | merit | eff | uni |
|---|---|---|---|---|---|---|---|---|---|---|---|
| Example 2 | L | 0 | 0.29 | 0.67 | 0.77 | 1 | 1 | | | | |
| | H | 0 | 235 | 348 | 600 | 507 | 0 | 159 | 0.4489 | 0.5389 | 0.2574 |
| Variant 1 | L | 0 | 0.29 | 0.67 | 0.77 | 1 | 1 | | | | |
| | H | 0 | 235 | 348 | 600 | 507 | 0 | 159 | 0.4798 | 0.5640 | 0.2405 |
| Variant 2 | L | 0 | 0.29 | 0.67 | 0.77 | 1 | 1 | | | | |
| | H | 0 | 235 | 348 | 600 | 507 | 0 | 159 | 0.4832 | 0.5669 | 0.2390 |

As shown in Table 3, the feature points in Example 2 of the grating structure 100 and its variants have the same abscissa and ordinate; correspondingly, they have the same parameters shown in Table 4.

TABLE 4

| (L5 − L4)/(L3 − L2) | L3 | L5 − L4 | L3 − L2 | (L5 − L4) + (L3 − L2) |
|---|---|---|---|---|
| 0.62 | 0.67 | 0.23 | 0.38 | 0.61 |

Referring to FIG. 11 and Table 3, by comparing Example 2 of the grating structure 100 and its variants, it can be found that, the merit values of the optical effect indices achieved by them have little difference, which shows that when the positions of the feature points are fixed, the optimization objective can be achieved by connecting between the feature points through straight lines or curves. In addition, Variant 1 and Variant 2 show that: with utilization of a curved profile, a relatively higher merit value of the optical effect is obtained by optimization, and the diffraction efficiency and uniformity are improved, which shows that the curved profile has a higher degree of structural freedom and is more flexible in the regulation of the light field, which is advantage to obtain a better optical effect.

Figure 12:
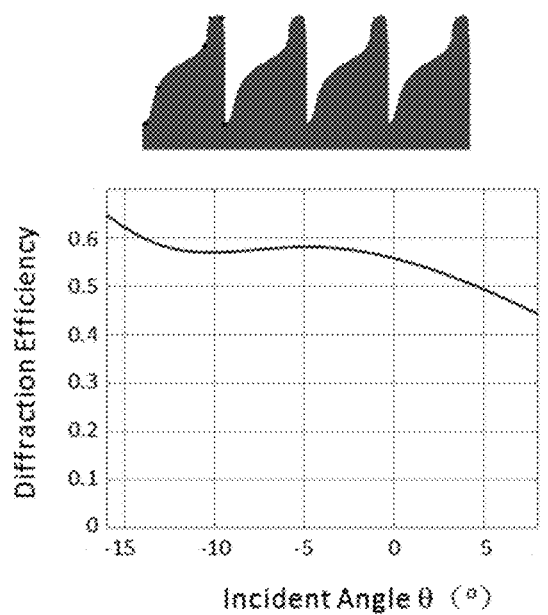
FIG. 12 shows Example 3 of a grating structure according to an embodiment of the present disclosure and curves of a diffraction efficiency changing with an incident angle when it is used as a coupling-in grating in a diffraction optical waveguide.

In order to more fully demonstrate the technical advantages of the grating structure 100 according to the embodiment of the present disclosure, a preferred example of the grating structure according to an embodiment of the present disclosure, i.e. Example 3, is introduced next with reference to FIG. 12. Similarly, FIG. 12 shows a cross-sectional view of a grating structure of Example 3 in an upper part, and a curve of the diffraction efficiency changing with the incident angle when the grating structure is used as a coupling-in grating in a diffraction optical waveguide is shown in a lower part.

In Example 3 shown in FIG. 12, the profile lines formed among the feature points of the cross-sectional profile of the grating line are all curve, and some parameters of the cross-sectional profile of the grating line and values of the indices merit, eff, and unit obtained by simulation are shown in Table 5. The unit of the parameter L in Table 5 is the grating line period "T", and the unit of the parameter H is "nm".

Furthermore, the grating structure of Example 3 has the following parameters shown in Table 6:

TABLE 6

| (L5 − L4)/(L3 − L2) | L3 | L5 − L4 | L3 − L2 | (L5 − L4) + (L3 − L2) |
|---|---|---|---|---|
| 0.19 | 0.72 | 0.11 | 0.59 | 0.70 |

It can be seen from Table 5 that, the grating structure of Example 3 shown in FIG. 12 achieves a very excellent optical effect, the merit value reaches 0.49, and the average diffraction efficiency eff is significantly improved, and the non-uniformity uni is well suppressed.

Figure 13:
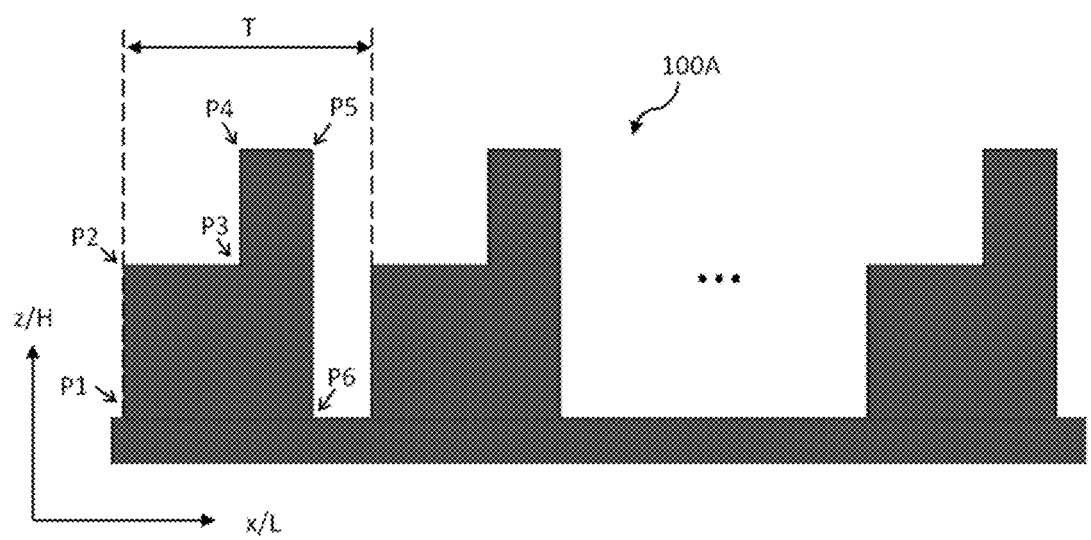
FIG. 13 is a cross-sectional diagram of a stepped grating structure according to an embodiment of the present invention.

The novel grating structure 100 according to the embodiment of the present disclosure includes a special type of grating structure, that is, a stepped grating structure, wherein the cross-sectional profile of the grating line of the grating structure 100 is a stepped profile. FIG. 13 schematically shows a stepped grating structure 100A according to an embodiment of the present disclosure. As shown in FIG. 13, in the stepped grating structure 100A, the coordinate parameters of the first to sixth feature points satisfy following relationships: L2=0, H2=H3, L3=L4, H4=H5, and L5=L6.

According to the embodiment of the present disclosure, in order to obtain a better optical effect, the cross-sectional profile of the grating line of the stepped grating structure 100A also satisfies following parameter conditions:

$$0.3T < L3-L2 < 0.7T;$$

$$0.1T < L5-L4 < 0.4T;$$

$$0.15 < (L5-L4)/(L3-L2) < 0.8;\ \text{and}$$

$$0.65T < L3-L2+L5-L4 < 0.9T.$$

In order to illustrate technical effects of the stepped grating structure 100A according to the embodiment of the present disclosure in terms of diffraction efficiency and uniformity, the following will introduce the simulation calculation (Simulation 2) and results thereof based on the grating structure 100A shown in FIG. 13.

TABLE 5

| Serial number | Coordinate | P1 | P2 | P3 | P4 | P5 | P6 | delta_h | merit | eff | uni |
|---|---|---|---|---|---|---|---|---|---|---|---|
| Example 3 | L | 0 | 0.13 | 0.72 | 0.80 | 0.91 | 0.94 | | | | |
| | H | 9.1 | 178 | 403 | 515 | 518 | 14.1 | 112 | 0.4902 | 0.5560 | 0.1880 |

Simulation 2

In Simulation 2, preset parameters are as below: L2=0, H3=H2, L3=L4, H4=H5, L5=L6.

On the basis of the above-preset parameters, through scanning the parameter L3-L2 with a step size of 0.025T within a range from 0.1T to 0.8T, scanning the parameter L5-L4 with a step size of 0.025T within a range from 0.05T to 0.4T, scanning the parameter H3 with a step size of 15 nm within a range from 150 nm to 450 nm, and scanning the parameter H5 with a step size of 15 nm within a range from 300 nm to 600 nm, various stepped grating structures with different cross-sectional profiles are obtained, and the average diffraction efficiency index eff and non-uniformity index uni are obtained through the simulation calculation based on the vector theory or scalar theory of light propagation, so as to calculate the value of the optical effect index merit.

Various results calculated in Simulation 2 are counted and drawn as different charts, which are shown in FIG. 14 to FIG. 18 respectively. In these charts, the meaning of each black dot represents the same meaning in the charts in FIGS. 4 to 8 introduced above, and will not be repeated here.

FIG. 14, FIG. 15, FIG. 16, FIG. 17, and FIG. 18 are charts of the optical effect indices merit(s) changing with the parameters $H_{drop}(s)$ (corresponding to the abscissas "delta_h"), L3-L2, (L5-L4)/(L3-L2), L3-L2+L5-L4, H3, and H5 based on the grating structure 100A shown in FIG. 13 in Simulation 2. The lower charts in FIG. 14, FIG. 15, FIG. 17, and FIG. 18 are all enlarged illustrations of the parts of dashed boxes in the upper charts.

Based on results shown in FIGS. 14 to 18, the optical effect index merit=0.31 is selected as a second primary optimization objective for the stepped grating structure, and merit=0.35 is selected as a second advanced optimization objective for the stepped grating structure. Compared with the optical effect that the existing rectangular grating and blazed grating can achieve after optimization (the merit values of the optical effect indices of the rectangular grating and blazed grating shown in FIG. 1 are 0.15 and 0.30, respectively), and these two optimization objectives represent a great improvement in the optical effect.

Here, the second primary optimization objective and the second advanced optimization objective are respectively set to be lower than the first primary optimization objective and the first advanced optimization objective described above, based on consideration of following two factors. On the one hand, for the stepped grating structure 100A whose coordinate parameters of the first to sixth feature points meet following conditions: L2=0, H2=H3, L3=L4, H4=H5, L5=L6, it is difficult in optimization to obtain the first primary or advanced optimization objective. On the other hand, the stepped cross-sectional profile of the grating line has great advantages in processing, including easiness in processing, and a high degree of conformity of a processed structure with respect to a design, which allows a product close to designed performance to be obtained. This is because a change in shape of the cross-sectional profile of the grating line in the height direction H needs to be realized through multiple exposure and etching processing stages during a process by using semiconductor lithography technology, while during a process by using a laser direct writing or gray exposure technology, a laser intensity needs to be finely adjusted and a relationship between a change of the laser intensity and a horizontal moving speed needs to be coordinated. In short, the processing is difficult. However, the change of the stepped cross-sectional profile of the grating line in the height direction H is relatively simple, which can significantly reduce the processing difficulty and improve a degree of conformity of a processed product to the design, and thus ensuring the optical effect/performance of the product. In short, although the second primary/advanced optimization objective in the design of the stepped grating structure 100A according to the embodiment of the present disclosure is lower than the first primary/advanced optimization objective in the design of the grating structure 100 according to the embodiment of the present disclosure, the optical effect of the former is expected to be closer to that of the latter for the final product, and it is able to have a better optical effect than the existing rectangular grating and blazed grating.

Figure 14:
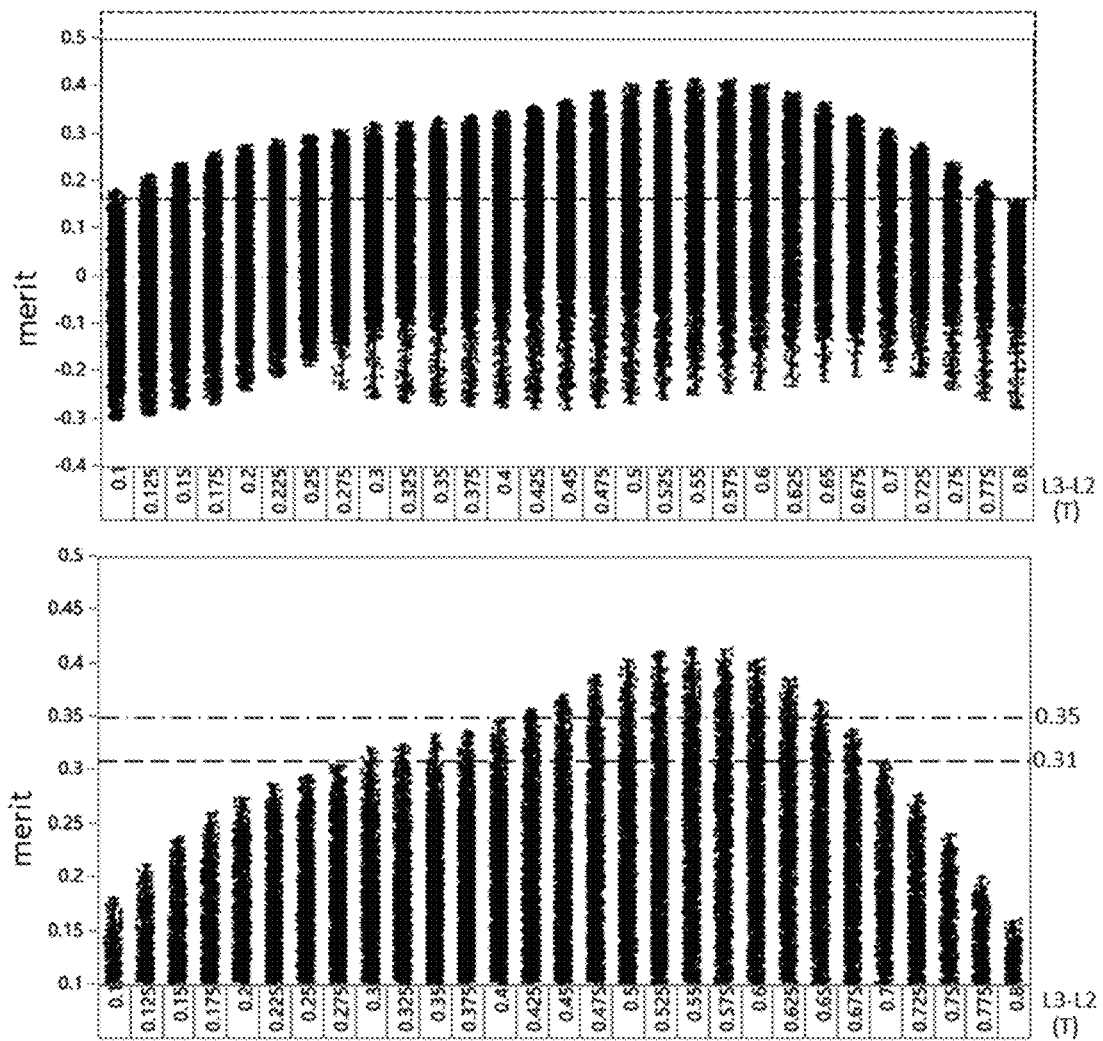
FIG. 14 are charts of optical effect indices changing with parameters L3−L2 based on simulation of the stepped grating structure shown in FIG. 13.

Referring to FIG. 14, it can be seen that, in the stepped grating structure 100A according to the embodiment of the present disclosure, in order to achieve the second primary optimization objective merit=0.31, advantageously 0.3T<L3-L2<0.7T; in order to achieve the second advanced optimization objective merit=0.35, advantageously 0.4T<L3-L2<0.66T.

Figure 15:
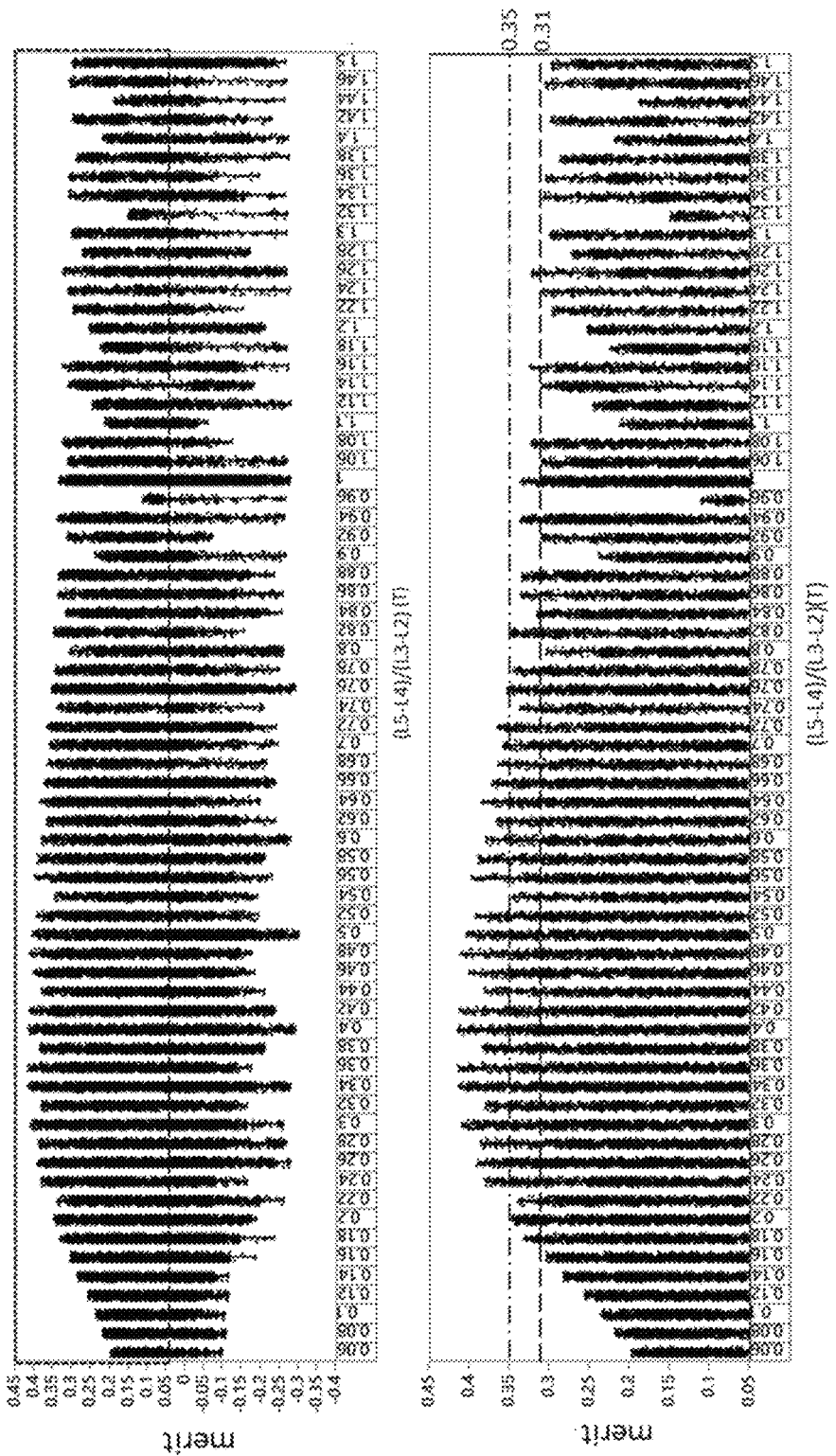
FIG. 15 are charts of optical effect indices changing with parameters (L5−L4)/(L3−L2) based on simulation of the stepped grating structure shown in FIG. 13.

Referring to FIG. 15, it can be seen that in the stepped grating structure 100A according to the embodiment of the present disclosure, in order to achieve the second primary optimization objective, advantageously 0.15<(L5-L4)/(L3-L2)<0.8; in order to achieve the second advanced optimization objective, advantageously 0.2<(L5-L4)/(L3-L2)<0.78.

Figure 16:
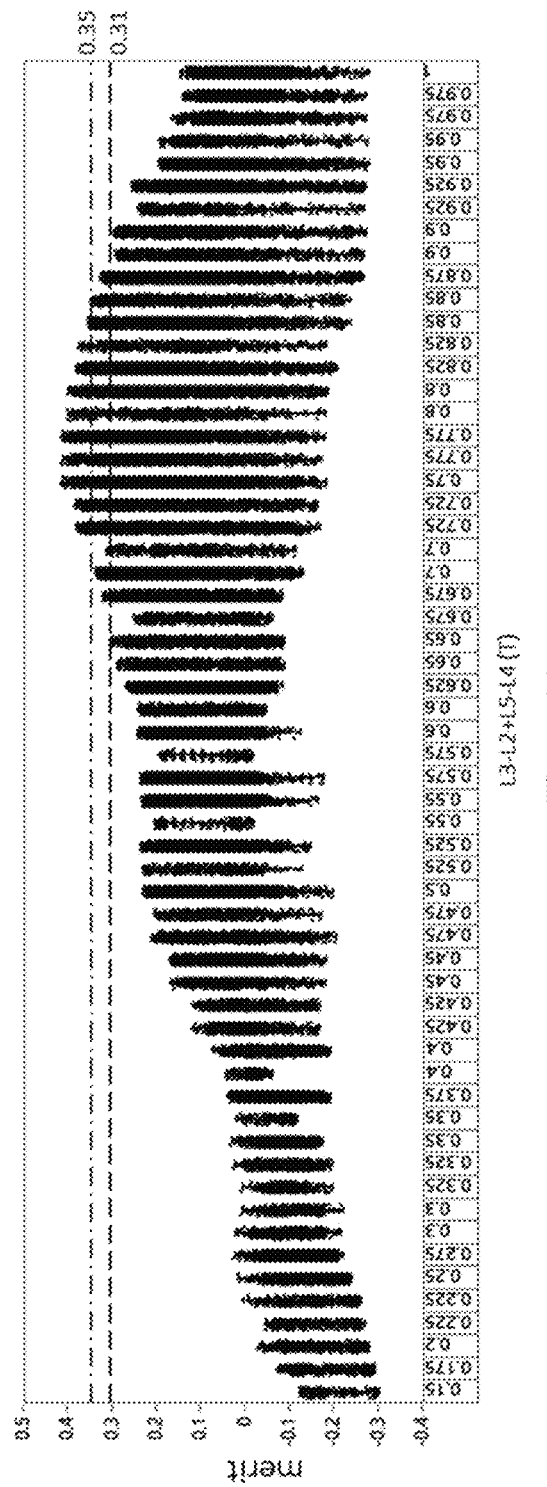
FIG. 16 is a diagram of an optical effect index changing with a parameter L3−L2+L5−L4 based on simulation of the stepped grating structure shown in FIG. 13.

Referring to FIG. 16, it can be seen that in the stepped grating structure 100A according to the embodiment of the present disclosure, in order to achieve the second primary optimization objective, advantageously 0.65T<L3-L2+L5-L4<0.9T; in order to achieve the second advanced optimization objective, advantageously 0.71T<L3-L2+L5-L4<0.85T.

Figure 17:
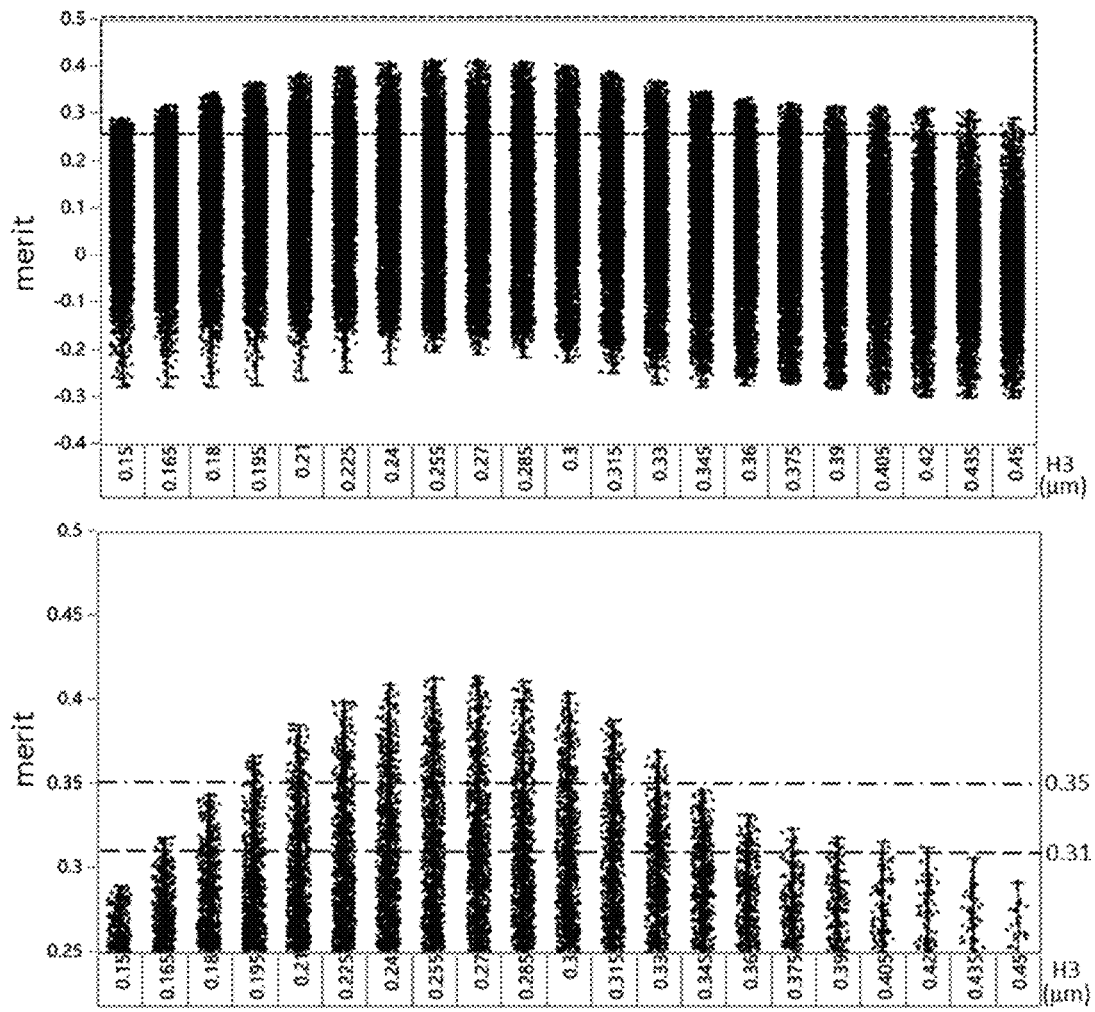
FIG. 17 are charts of optical effect indices changing with parameters H3 based on simulation of the stepped grating structure shown in FIG. 13.

Referring to FIG. 17, it can be seen that in the stepped grating structure 100A according to the embodiment of the present disclosure, in order to achieve the second primary optimization objective, advantageously 160 nm<H3<420 nm; in order to achieve the second advanced optimization objective, advantageously 185 nm<H3<340 nm.

Figure 18:
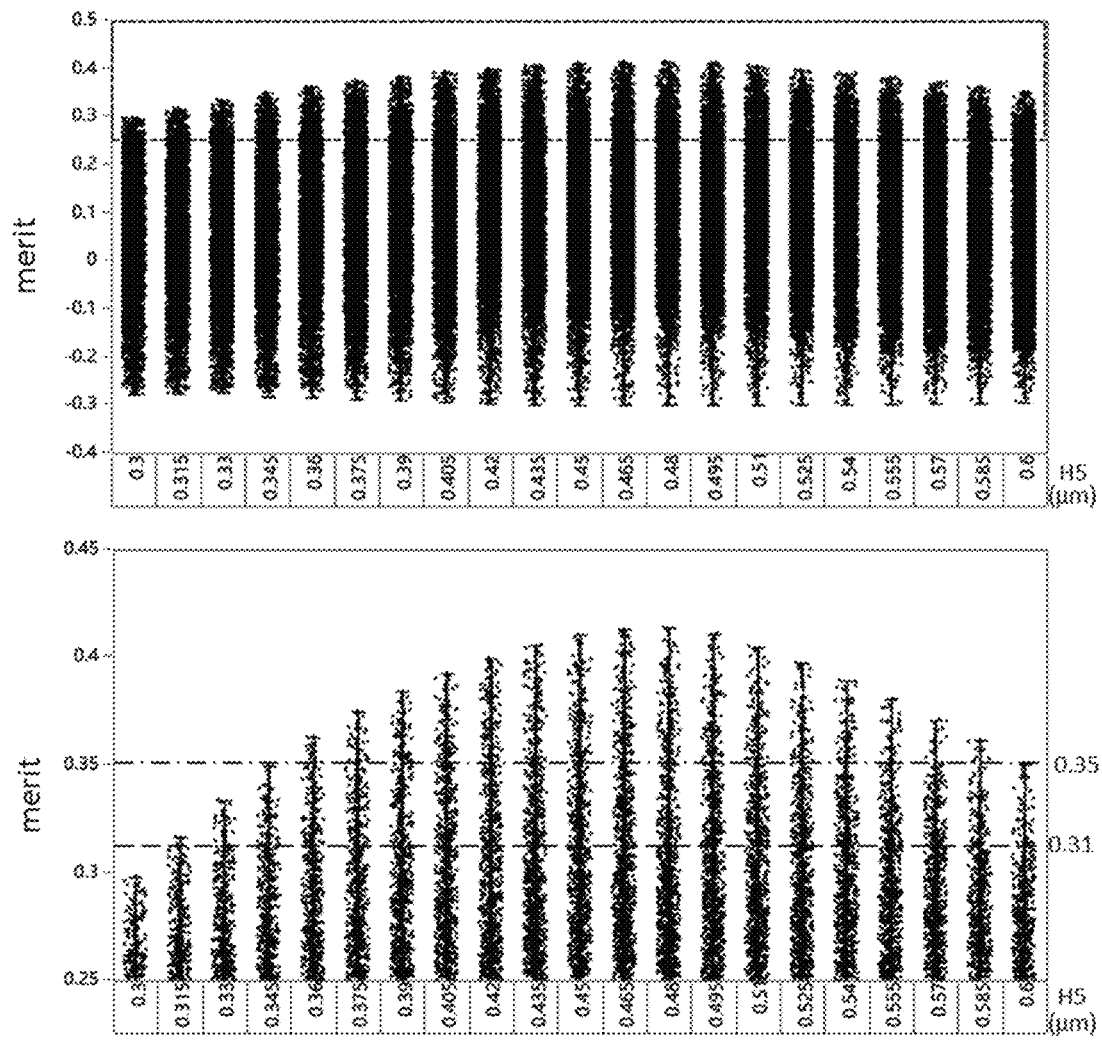
FIG. 18 are charts of optical effect indices changing with parameters H5 based on simulation of the stepped grating structure shown in FIG. 13.

Referring to FIG. 18, it can be seen that, in the stepped grating structure 100A according to the embodiment of the present disclosure, in order to achieve the second primary optimization objective, advantageously 320 nm<H5<600 nm; in order to achieve the second advanced optimization objective, advantageously 350 nm<H5<590 nm.

Figure 19:
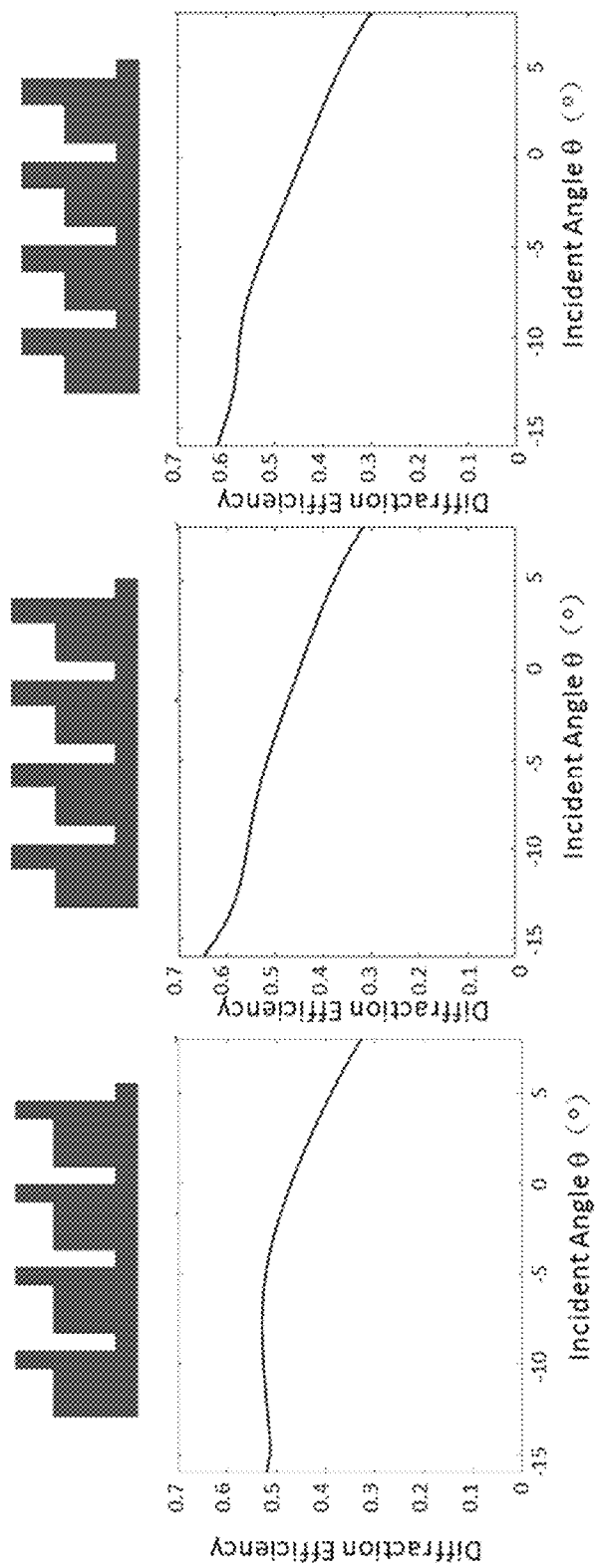
FIG. 19 shows stepped grating structures with respect to Example 1, Example 2, and Example 3 according to embodiments of the present disclosure and curves of diffraction efficiencies changing with incident angles when they are respectively used as coupling-in gratings in diffraction optical waveguides.
Figure 20:
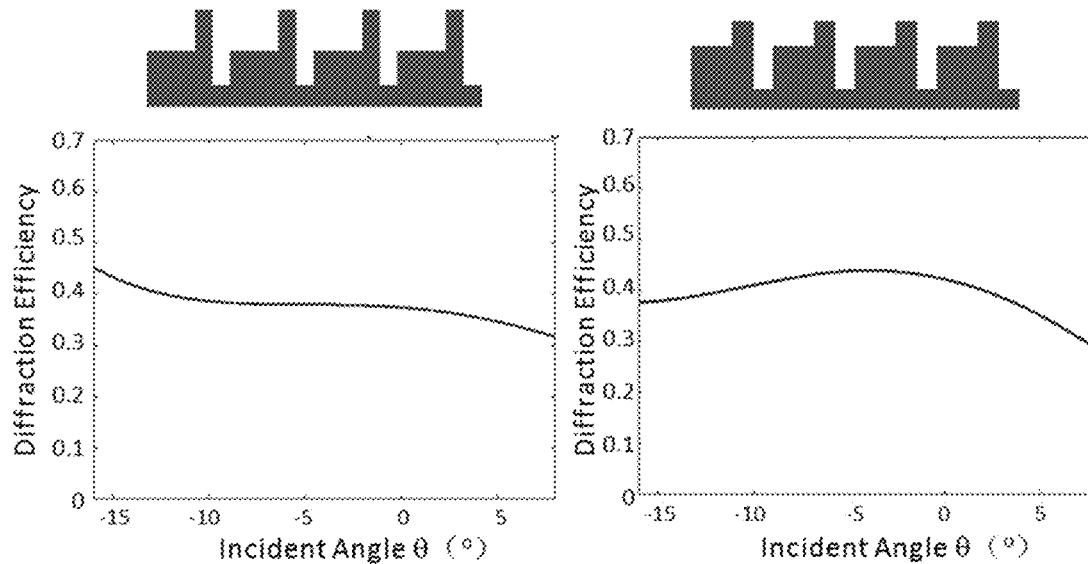
FIG. 20 shows stepped grating structures with respect to Example 4 and Example 5 according to embodiments of the present disclosure and curves of the diffraction efficiencies changing with the incident angles when they are respectively used as coupling-in gratings in diffraction optical waveguides.

In order to show the technical advantages of the stepped grating structure 100A according to the embodiment of the present disclosure, several preferred examples of the stepped grating structure 100A according to the embodiment of the present disclosure are introduced next with reference to FIG. 19 and FIG. 20. An upper part of FIG. 19 shows Example 1, Example 2, and Example 3 of the grating structure 100A respectively from left to right, an upper part of FIG. 20 shows Example 4 and Example 5 respectively from left to right, and lower parts of FIG. 19 and FIG. 20 shows curves of the diffraction efficiencies changing with the incident angles when they are respectively used as coupling-in gratings in the diffraction optical waveguides.

In the examples shown in FIG. 19 and FIG. 20, some parameters of the cross-sectional profile of the grating line and the values of the indices merit, eff, and unit obtained by simulation are shown in Table 7. The unit of the parameter L in Table 7 is the grating line period "T", and the unit of the parameter H is "nm".

TABLE 7

| Serial number | Coordinate | P1 | P2 | P3 | P4 | P5 | P6 | delta_h | merit | eff | uni |
|---|---|---|---|---|---|---|---|---|---|---|---|
| Example 1 | L | 0 | 0 | 0.53 | 0.53 | 0.78 | 0.78 | | | | |
| | H | 0 | 300 | 300 | 479 | 479 | 0 | 179 | 0.3933 | 0.4761 | 0.2368 |
| Example 2 | L | 0 | 0 | 0.47 | 0.47 | 0.76 | 0.76 | | | | |
| | H | 0 | 286 | 286 | 501 | 501 | 0 | 215 | 0.3711 | 0.4916 | 0.3442 |
| Example 3 | L | 0 | 0.00 | 0.46 | 0.46 | 0.77 | 0.77 | | | | |
| | H | 0 | 249 | 249 | 452 | 452 | 0 | 203 | 0.3658 | 0.4863 | 0.3445 |
| Example 4 | L | 0 | 0 | 0.58 | 0.58 | 0.78 | 0.78 | | | | |
| | H | 0 | 165 | 165 | 360 | 360 | 0 | 195 | 0.3176 | 0.3793 | 0.1763 |
| Example 5 | L | 0 | 0 | 0.50 | 0.50 | 0.75 | 0.75 | | | | |
| | H | 0 | 210 | 210 | 330 | 330 | 0 | 120 | 0.3208 | 0.3953 | 0.2130 |

The grating structures of the examples shown in FIG. 19 and FIG. 20 have following parameters shown in Table 8:

TABLE 8

| Serial number | (L5 − L4)/(L3 − L2) | L3 | L5 − L4 | L3 − L2 | (L5 − L4) + (L3 − L2) |
|---|---|---|---|---|---|
| Example 1 | 0.47 | 0.53 | 0.25 | 0.53 | 0.78 |
| Example 2 | 0.62 | 0.47 | 0.29 | 0.47 | 0.76 |
| Example 3 | 0.67 | 0.46 | 0.31 | 0.46 | 0.77 |
| Example 4 | 0.35 | 0.58 | 0.20 | 0.58 | 0.78 |
| Example 5 | 0.50 | 0.50 | 0.25 | 0.50 | 0.75 |

Referring to FIG. 19, FIG. 20, and Table 7 together, it can be seen that, Example 1, Example 2, and Example 3 of the stepped grating structure 100A all achieve the second advanced optimization objective, and Example 4 and Example 5 achieve the second primary optimization objective.

Figure 21:
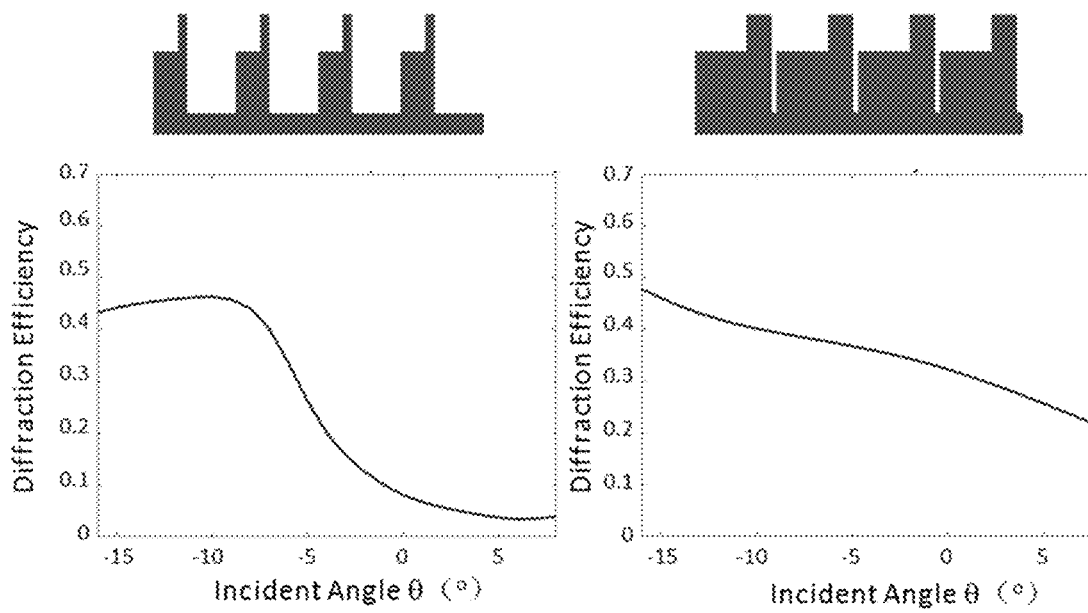
FIGS. 21 and 22 show stepped grating structures with respect to Comparative Example 1, Comparative Example 2, Comparative Example 3, and Comparative Example 4 as well as curves of diffraction efficiencies changing with incident angles when they are respectively used as coupling-in gratings in diffraction optical waveguides.
Figure 22:
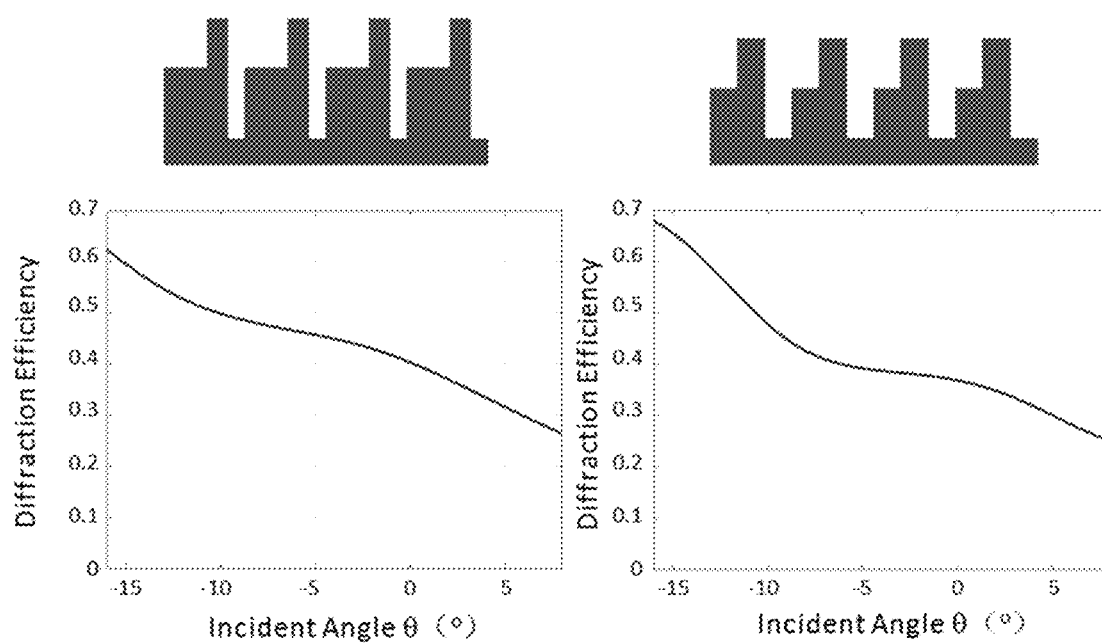

In addition, as a comparison, FIG. 21 shows Comparative Example 1 (left side) and Comparative Example 2 (right side) of the stepped grating structure 100A and the curves of the diffraction efficiencies changing with the incident angles when they are respectively used as coupling-in gratings in the diffraction optical waveguides; FIG. 22 shows Comparative Example 3 (left side) and Comparative Example 4 (right side) of the stepped grating structure 100A and the curves of the diffraction efficiencies changing with the incident angles when they are respectively used as coupling-in gratings in the diffraction optical waveguides.

Table 9 shows some parameters of the cross-sectional profile of the grating line in each Comparative Example shown in FIG. 21 and FIG. 22 and the values of the indices merit, eff, and uni obtained by simulation. The unit of the parameter L in Table 9 is the grating line period "T", and the unit of the parameter H is "nm".

TABLE 9

| Serial number | Coordinate | P1 | P2 | P3 | P4 | P5 | P6 | delta_h | merit | eff | uni |
|---|---|---|---|---|---|---|---|---|---|---|---|
| Example 1 | L | 0 | 0 | 0.30 | 0.30 | 0.40 | 0.40 | | | | |
| | H | 0 | 300.2 | 300.2 | 479.1 | 479.1 | 0 | 178.9 | −0.0586 | 0.2433 | 0.8623 |
| Example 2 | L | 0 | 0 | 0.63 | 0.63 | 0.93 | 0.93 | | | | |
| | H | 0 | 300.2 | 300.2 | 479.1 | 479.1 | 0 | 178.9 | 0.2164 | 0.3509 | 0.3843 |
| Example 3 | L | 0 | 0 | 0.54 | 0.54 | 0.78 | 0.78 | | | | |
| | H | 0 | 350 | 350 | 590 | 590 | 0 | 240 | 0.2975 | 0.4392 | 0.4050 |
| Example 4 | L | 0 | 0 | 0.33 | 0.33 | 0.67 | 0.67 | | | | |
| | H | 0 | 240 | 240 | 480 | 480 | 0 | 240 | 0.2988 | 0.4425 | 0.4107 |

The grating structure of each Comparative Example shown in FIG. 19 and FIG. 20 has following parameters shown in Table 10:

TABLE 10

| Serial number | (L5 − L4)/(L3 − L2) | L3 | L5 − L4 | L3 − L2 | (L5 − L4) + (L3 − L2) |
|---|---|---|---|---|---|
| Example 1 | 0.33 | 0.30 | 0.10 | 0.30 | 0.40 |
| Example 2 | 0.48 | 0.63 | 0.30 | 0.63 | 0.93 |
| Example 3 | 0.47 | 0.54 | 0.25 | 0.54 | 0.78 |
| Example 4 | 1.00 | 0.33 | 0.33 | 0.33 | 0.67 |

Referring to FIG. 21, FIG. 22, Table 9, and Table 10, it can be seen that, not all stepped grating structures with six feature points in the cross-sectional profile can achieve a better optical effect. In contrast, the grating structure that meets the various parameter conditions of the stepped grating structure 100A according to the embodiment of the present disclosure described above in conjunction with Simulation 2 and FIGS. 14 to 18 has outstanding advantages in obtaining and realizing excellent optical effect.

The grating structure and diffraction optical waveguide according to the embodiments of the present disclosure can be applied to a display device. Such a display device is, for example, a near-eye display device, which includes a lens and a frame for holding the lens close to the eye, wherein the lens may include the grating structure and/or diffraction optical waveguide according to the embodiments of the present disclosure as described above. Preferably, the display device may be an augmented reality display device or a virtual reality display device.

As discussed above with reference to the illustration of the figures, the followings are provided in this application:

(1) A grating structure, comprising a plurality of grating lines arranged in a plane, the plurality of grating lines being arranged with a period of T along a first direction in the plane and extending along a second direction perpendicular to the first direction, wherein, at least part of the plurality of grating lines each have cross-sectional profiles with narrow tops and wide bottoms in a cross section perpendicular to the second direction, each of the cross-sectional profiles comprises six feature points being in sequence along the first direction, which are a first feature point, a second feature point, a third feature point, a fourth feature point, a fifth feature point and a sixth feature point, and the feature points are the points where maximum curvatures of the cross-sectional profile are located (i.e. the feature points are maximum-curvature points of the cross-sectional profile); and, in a coordinate system with the first feature point as an origin, the first direction as a first coordinate axis L, and a direction perpendicular to the plane as a second coordinate axis H, the first feature point, the second feature point, the third feature point, the fourth feature point, the fifth feature point, and the sixth feature point respectively have coordinates (0, 0), (L2, H2), (L3, H3), (L4, H4), (L5, H5) and (L6, 0), and satisfy following relationships:

$$H_{drop} = \min(H4, H5) - \max(H3, H2) > 50 \text{ nm};$$

$$0.1 < (L5-L4)/(L3-L2);$$

$$L3 > 0.34T; \text{ and}$$

$$0.05T < L5-L4 < 0.32T.$$

(2) The grating structure of item (1), wherein 0.025T<L3−L2<0.65T.

(3) The grating structure of item (1), wherein the six feature points further satisfy at least one of following relationships:

$$140 \text{ nm} < H_{drop} < 200 \text{ nm};$$

$$0.13T < L5-L4 < 0.25T;$$

$$L3 > 0.59T; \text{ and}$$

$$0.05T < L3-L2 < 0.3T.$$

(4) The grating structure of item (1), wherein min(H4, H5)>200 nm; and min(H2, H3)>50 nm.

(5) The grating structure of item (4), wherein min(H4, H5)>400 nm; and/or min(H2,H3)>150 nm.

(6) The grating structure of any one of items (1)-(5), wherein the cross-sectional profile comprises at least a curve which is formed between two adjacent feature points among the first feature point, the second feature point, the third feature point, the fourth feature point, the fifth feature point, and the sixth feature point.

(7) The grating structure of item (6), wherein the cross-sectional profile comprises at least a straight line which is formed between two adjacent feature points among the first feature point, the second feature point, the third feature point, the fourth feature point, the fifth feature point, and the sixth feature point.

(8) The grating structure of any one of items (1)-(5), wherein the cross-sectional profile comprises five straight lines each of which is formed between two adjacent feature points among the first feature point, the second feature point, the third feature point, the fourth feature point, the fifth feature point, and the sixth feature point.

(9) The grating structure of item (8), wherein the cross-sectional profile is a stepped profile, where L2=0, H2=H3, L3=L4, H4=H5, and L5=L6; and following relationships are satisfied:

$$0.3T < L3-L2 < 0.7T;$$

$$0.1T < L5-L4 < 0.4T;$$

$$0.15 < (L5-L4)/(L3-L2) < 0.8; \text{ and}$$

$$0.65T < L3-L2+L5-L4 < 0.9T.$$

(10) The grating structure of item (9), wherein 160 nm<H3<420 nm, 320 nm<H5<600 nm.

(11) The grating structure of item (9), wherein the six feature points further satisfy at least one of following relationships:

$$0.4T < L3-L2 < 0.66T;$$

$$0.2 < (L5-L4)/(L3-L2) < 0.78;$$

$$0.71T < L3-L2+L5-L4 < 0.85T;$$

$$185 \text{ nm} < H3 < 340 \text{ nm}; \text{ and}$$

$$350 \text{ nm} < H5 < 590 \text{ nm}.$$

(12) The grating structure of any one of items (1)-(5), wherein H2≠H3, and/or H4≠H5.

(13) The grating structure of item (12), wherein H2>H3, and/or H4>H5.

(14) The grating structure of item (12), wherein |H4−H5|<100 nm, and/or |H2−H3|<100 nm.

(15) A diffraction optical waveguide for display, comprising a waveguide substrate and a coupling-in grating arranged on the waveguide substrate, wherein the coupling-in grating comprises the grating structure of any one of items (1)-(14), which is configured to couple a light beam into the waveguide substrate, enabling the light beam to propagate within the waveguide substrate through total internal reflection.

(16) The diffraction optical waveguide of item (15), further comprising a coupling-out grating arranged on the waveguide substrate, wherein the coupling-out grating is configured to couple at least a portion of the light beam within the waveguide substrate propagating thereinto through total internal reflection substantially along a coupling-in direction out of the waveguide substrate by diffraction, the first direction being substantially consistent with the coupling-in direction.

(17) A display apparatus, comprising the diffractive optical waveguide of item (15) or (16).

(18) The display apparatus of item (17), wherein the display apparatus is a near-eye display apparatus and comprises a lens and a frame for holding the lens close to the eye, the lens comprising the diffractive optical waveguide.

(19) The display apparatus of items (17) or (18), wherein the display apparatus is an augmented reality display apparatus or a virtual reality display apparatus.

The above description is merely an illustration of the preferred embodiments of the present application and the applied technical principles. Those skilled in the art should understand that the scope of the disclosure involved in the present application is not limited to the technical solution formed by the specific combination of the above technical features, but also covers other technical solutions formed by any combination of the above technical features or their equivalent features without departing from the inventive concept. For example, the technical solution is formed by replacing the above features with (but not limited to) the technical features with similar functions disclosed in the present application.

What is claimed is:

1. A grating structure, comprising a plurality of grating lines arranged in a plane, the plurality of grating lines being arranged with a period of T along a first direction in the plane and extending along a second direction perpendicular to the first direction, wherein,
- each of at least part of the plurality of grating lines has a cross-sectional profile with a narrow top and a wide bottom in a cross section perpendicular to the second direction, the cross-sectional profile comprises six feature points being in sequence along the first direction, which are a first feature point, a second feature point, a third feature point, a fourth feature point, a fifth feature point and a sixth feature point, and the feature points are maximum-curvature points of the cross-sectional profile; and
- in a coordinate system with the first feature point as an origin, the first direction as a first coordinate axis L, and a direction perpendicular to the plane as a second coordinate axis H, the first feature point, the second feature point, the third feature point, the fourth feature point, the fifth feature point, and the sixth feature point respectively have coordinates (0, 0), (L2, H2), (L3, H3), (L4, H4), (L5, H5) and (L6, 0), and satisfy following relationships, so that both diffraction efficiency and uniformity are well-maintained:

$H_{drop} = \min(H4,H5) - \max(H3,H2) > 50$ nm;

$0.1 < (L5-L4)/(L3-L2)$;

$L3 > 0.34T$; and $0.05T < L5-L4 < 0.32T$.

2. The grating structure of claim 1, wherein $0.025T < L3-L2 < 0.65T$.

3. The grating structure of claim 1, wherein the six feature points further satisfy at least one of following relationships:

140 nm $< H_{drop} <$ 200 nm $0.13T < L5-L4 < 0.25T$;

$L3 > 0.59T$; and $0.05T < L3-L2 < 0.3T$.

4. The grating structure of claim 1, wherein,
min(H4, H5)>200 nm; and
min(H2, H3)>50 nm.

5. The grating structure of claim 4, wherein,
min(H4,H5)>400 nm; and/or
min(H2,H3)>150 nm.

6. The grating structure of claim 1, wherein the cross-sectional profile comprises at least a curve which is formed between two adjacent feature points among the first feature point, the second feature point, the third feature point, the fourth feature point, the fifth feature point, and the sixth feature point.

7. The grating structure of claim 6, wherein the cross-sectional profile comprises at least a straight line which is formed between two adjacent feature points among the first feature point, the second feature point, the third feature point, the fourth feature point, the fifth feature point, and the sixth feature point.

8. The grating structure of claim 1, wherein the cross-sectional profile comprises five straight lines each of which is formed between two adjacent feature points among the first feature point, the second feature point, the third feature point, the fourth feature point, the fifth feature point, and the sixth feature point.

9. The grating structure of claim 1, wherein the cross-sectional profile comprises five straight lines each of which is formed between two adjacent feature points among the first feature point, the second feature point, the third feature point, the fourth feature point, the fifth feature point, and the sixth feature point,
the cross-sectional profile is a stepped profile, wherein L2=0, H2=H3, L3=L4, H4=H5, and L5=L6; and following relationships are satisfied:

$0.3T < L3-L2 < 0.7T$;

$0.1T < L5-L4 < 0.4T$;

$0.15 < (L5-L4)/(L3-L2) < 0.8$; and $0.65T < L3-L2+L5-L4 < 0.9T$.

10. The grating structure of claim 9, wherein 160 nm$<H3<$420 nm, 320 nm$<H5<$600 nm.

11. The grating structure of claim 9, wherein the six feature points further satisfy at least one of following relationships:

$0.4T < L3-L2 < 0.66T$;

$0.2 < (L5-L4)/(L3-L2) < 0.78$;

$0.71T < L3-L2+L5-L4 < 0.85T$;

185 nm$<H3<$340 nm; and

12. The grating structure of claim 9, wherein the six feature points further satisfy at least one of following relationships:

$0.4T < L3-L2 < 0.66T$;

$0.2 < (L5-L4)/(L3-L2) < 0.78$;

$0.71T < L3-L2+L5-L4 < 0.85T$;

350 nm$<H5<$590 nm.

13. The grating structure of claim 1, wherein H2/H3, and/or H4H5.

14. The grating structure of claim 13, wherein H2>H3, and/or H4>H5.

15. The grating structure of claim 13, wherein |H4-H5|<100 nm, and/or |H2-H3|<100 nm.

16. A diffraction optical waveguide for display, comprising a waveguide substrate and a coupling-in grating arranged on the waveguide substrate, wherein the coupling-in grating comprises the grating structure of claim 1, which is configured to couple a light beam into the waveguide substrate, enabling the light beam to propagate within the waveguide substrate through total internal reflection.

17. The diffraction optical waveguide of claim 16, further comprising a coupling-out grating arranged on the waveguide substrate, wherein the coupling-out grating is configured to couple at least a portion of the light beam within the waveguide substrate propagating thereinto through total internal reflection substantially along a coupling-in direction out of the waveguide substrate by diffraction, the first direction being substantially consistent with the coupling-in direction.

18. A display device comprising the diffraction optical waveguide of claim 16.

19. The display device of claim 18, wherein the display device is a near-eye display device and comprises a lens and a frame for holding the lens close to the eye, the lens comprising the diffraction optical waveguide.

20. The display device of claim 18, wherein the display device is an augmented reality display device or a virtual reality display device.

\* \* \* \* \*